US011233647B1

(12) United States Patent
Fontaine

(10) Patent No.: US 11,233,647 B1
(45) Date of Patent: Jan. 25, 2022

(54) DIGITAL IDENTITY AUTHENTICATION SYSTEM

(71) Applicant: Hushmesh Inc., Falls Church, VA (US)

(72) Inventor: Jean-Emmanuel Fontaine, Falls Church, VA (US)

( * ) Notice: Subject to any disclaimer, the term of this patent is extended or adjusted under 35 U.S.C. 154(b) by 183 days.

(21) Appl. No.: 16/383,701

(22) Filed: Apr. 15, 2019

Related U.S. Application Data

(60) Provisional application No. 62/657,510, filed on Apr. 13, 2018.

(51) Int. Cl.
*H04L 9/32* (2006.01)
*G06K 19/06* (2006.01)

(52) U.S. Cl.
CPC ........ *H04L 9/321* (2013.01); *G06K 19/06037* (2013.01); *H04L 9/3215* (2013.01); *H04L 9/3228* (2013.01); *H04L 2209/603* (2013.01)

(58) Field of Classification Search
CPC ... H04L 9/321; H04L 63/0815; H04L 9/3213; H04L 9/3263; H04L 9/0825; H04L 9/3236; H04L 9/083; H04L 9/3271; H04L 9/3215; H04L 9/3247; H04L 9/3231; H04L 9/3228; H04L 9/3234; H04L 9/3226; H04L 63/0853; H04L 63/0838; H04L 63/0823; H04L 63/083; H04L 63/08; H04L 63/0861; H04L 2463/082; H04L 2209/603; G06F 21/41; G06F 21/31; G06K 19/06037; H04W 12/069
See application file for complete search history.

(56) References Cited

U.S. PATENT DOCUMENTS

| | | | |
|---|---|---|---|
| 7,418,596 B1 | 8/2008 | Carroll | |
| 7,748,035 B2 * | 6/2010 | Nedeltchev | H04L 63/20 726/15 |
| 9,117,324 B2 | 8/2015 | Buer | |
| 9,420,336 B1 * | 8/2016 | Woodhead | H04N 21/6118 |
| 9,609,003 B1 * | 3/2017 | Chmielewski | G06Q 40/08 |
| 9,792,188 B2 * | 10/2017 | Shen | G06F 11/2005 |

(Continued)

OTHER PUBLICATIONS

Location-enhanced Authentication using the IoT. Agadakos et al. ACM. (Year: 2016).

(Continued)

*Primary Examiner* — David Garcia Cervetti
(74) *Attorney, Agent, or Firm* — Alexander Franco

(57) ABSTRACT

A system and associated methods provide digital identity and strong authentication management services for Internet users. The system includes a central, cloud-based, online service, referred to as a central service, which can manage user accounts. The system also includes dedicated, always-on, always-connected, cryptographically unique devices, referred to as beacons, located within the physical residences of its users. The central service associates each beacon with the residence address of its user by physically sending a unique address verification code by postal mail to the user's residence. The user presents the unique code to the beacon, and the beacon cryptographically confirms its identity and the unique code sent to the residence address back to the central service. The beacons can attest to users' identities and provide seamless strong authentication to third-party online service providers on behalf of those users.

16 Claims, 16 Drawing Sheets

(56) References Cited

U.S. PATENT DOCUMENTS

| | | | |
|---|---|---|---|
| 9,798,899 B1* | 10/2017 | Takahashi | G06F 21/76 |
| 9,917,921 B2 | 3/2018 | Erola | |
| 10,079,839 B1* | 9/2018 | Bryan | G05B 15/02 |
| 10,361,858 B2 | 7/2019 | Fontaine | |
| 10,382,452 B1* | 8/2019 | Dawes | G06F 3/041 |
| 10,560,431 B1* | 2/2020 | Chen | H04L 67/10 |
| 10,735,249 B2* | 8/2020 | Baum | H04L 67/125 |
| 2003/0172090 A1* | 9/2003 | Asunmaa | G06F 21/31 |
| 2005/0038526 A1* | 2/2005 | Choi | H04L 41/0856 |
| | | | 700/1 |
| 2005/0125690 A1* | 6/2005 | Chin | G06F 9/3802 |
| | | | 726/4 |
| 2006/0073811 A1 | 4/2006 | Ekberg | |
| 2007/0162748 A1* | 7/2007 | Okayama | H04L 63/0815 |
| | | | 713/165 |
| 2008/0022084 A1* | 1/2008 | Raftelis | H04L 63/164 |
| | | | 713/153 |
| 2008/0120675 A1* | 5/2008 | Morad | H04N 21/44055 |
| | | | 725/120 |
| 2008/0154633 A1 | 6/2008 | Ishibashi | |
| 2008/0189556 A1* | 8/2008 | Modica | H04L 63/0485 |
| | | | 713/192 |
| 2008/0235517 A1* | 9/2008 | Ohmori | H04L 9/0891 |
| | | | 713/187 |
| 2009/0077624 A1* | 3/2009 | Baum | H04L 12/2834 |
| | | | 726/1 |
| 2009/0134998 A1* | 5/2009 | Baum | H04L 67/025 |
| | | | 340/539.1 |
| 2009/0138600 A1* | 5/2009 | Baum | H04L 12/2809 |
| | | | 709/226 |
| 2009/0144202 A1 | 6/2009 | Hurry | |
| 2009/0165114 A1* | 6/2009 | Baum | H04L 67/025 |
| | | | 726/12 |
| 2009/0300747 A1* | 12/2009 | Ahn | H04L 63/0876 |
| | | | 726/9 |
| 2010/0138895 A1* | 6/2010 | Bouchat | H04L 63/102 |
| | | | 726/1 |
| 2010/0153853 A1* | 6/2010 | Dawes | H04L 67/025 |
| | | | 715/736 |
| 2010/0202467 A1* | 8/2010 | Otani | G06F 1/324 |
| | | | 370/401 |
| 2011/0289568 A1* | 11/2011 | Uchiyama | H04L 67/125 |
| | | | 726/6 |
| 2012/0188072 A1* | 7/2012 | Dawes | H04L 12/2825 |
| | | | 340/514 |
| 2012/0216034 A1* | 8/2012 | Chen | H04L 63/0209 |
| | | | 713/153 |
| 2012/0278453 A1* | 11/2012 | Baum | H04L 41/069 |
| | | | 709/220 |
| 2012/0278877 A1* | 11/2012 | Baum | H04L 63/20 |
| | | | 726/12 |
| 2012/0324566 A1* | 12/2012 | Baum | H04M 11/04 |
| | | | 726/12 |
| 2013/0267199 A1 | 10/2013 | Kamal | |
| 2013/0268574 A1* | 10/2013 | Raghunathan | G06Q 10/087 |
| | | | 709/201 |
| 2014/0087660 A1* | 3/2014 | Kim | H04L 12/282 |
| | | | 455/41.1 |
| 2014/0172957 A1* | 6/2014 | Baum | G08B 25/10 |
| | | | 709/203 |
| 2014/0281493 A1 | 9/2014 | Nakhjiri | |
| 2015/0082414 A1* | 3/2015 | Dawes | H04L 61/2578 |
| | | | 726/12 |
| 2015/0195727 A1* | 7/2015 | Van Oost | H04L 43/026 |
| | | | 370/252 |
| 2015/0208255 A1* | 7/2015 | Belk | H04M 3/2245 |
| | | | 455/418 |
| 2015/0237018 A1* | 8/2015 | Parry | H04L 61/2015 |
| | | | 713/162 |
| 2015/0249540 A1 | 9/2015 | Khalil | |
| 2015/0334087 A1* | 11/2015 | Dawes | H04L 63/02 |
| | | | 726/12 |
| 2016/0036944 A1* | 2/2016 | Kitchen | H04L 12/2834 |
| | | | 709/203 |
| 2016/0044124 A1* | 2/2016 | Sarukkai | H04L 67/42 |
| | | | 709/224 |
| 2016/0119141 A1 | 4/2016 | Jing | |
| 2016/0203315 A1 | 7/2016 | Wentz | |
| 2016/0241405 A1 | 8/2016 | Jeong | |
| 2016/0274759 A1* | 9/2016 | Dawes | H04M 11/04 |
| 2017/0006471 A1* | 1/2017 | Kim | H04L 63/083 |
| 2017/0054571 A1* | 2/2017 | Kitchen | H04L 12/4625 |
| 2017/0054594 A1* | 2/2017 | Decenzo | G08B 25/08 |
| 2017/0118180 A1* | 4/2017 | Takahashi | H04L 9/0819 |
| 2017/0180198 A1* | 6/2017 | Baum | H04L 12/283 |
| 2017/0228726 A1 | 8/2017 | Bohanan | |
| 2017/0242742 A1* | 8/2017 | Akiba | G06F 11/0787 |
| 2017/0262636 A1* | 9/2017 | Akiba | G06F 21/44 |
| 2017/0310500 A1* | 10/2017 | Dawes | H04L 67/32 |
| 2017/0317981 A1* | 11/2017 | Klein | H04W 12/041 |
| 2017/0353324 A1* | 12/2017 | Baum | H04L 67/125 |
| 2017/0357528 A1* | 12/2017 | Puranik | H04L 67/10 |
| 2018/0091326 A1* | 3/2018 | McLaughlin | H04L 41/0893 |
| 2018/0091327 A1* | 3/2018 | McLaughlin | H04L 67/22 |
| 2018/0191720 A1* | 7/2018 | Dawes | G06Q 50/26 |
| 2018/0198688 A1* | 7/2018 | Dawes | G06F 3/0488 |
| 2018/0198755 A1* | 7/2018 | Domangue | H04L 63/02 |
| 2018/0198756 A1* | 7/2018 | Dawes | G06F 21/00 |
| 2018/0198788 A1* | 7/2018 | Helen | H04L 63/10 |
| 2019/0109818 A1* | 4/2019 | Baum | G08B 25/008 |
| 2019/0124070 A1* | 4/2019 | Engan | H04L 63/0807 |
| 2019/0158304 A1* | 5/2019 | Sundermeyer | H04L 67/125 |
| 2019/0197879 A1* | 6/2019 | Raji | H04L 12/2803 |
| 2019/0228143 A1 | 7/2019 | Guyomarc'h | |
| 2019/0245869 A1* | 8/2019 | Dawes | H04L 12/2803 |
| 2019/0289134 A1* | 9/2019 | Dawes | H04L 63/20 |
| 2019/0313254 A1* | 10/2019 | Zaks | H04W 48/06 |
| 2019/0394043 A1 | 12/2019 | Fontaine | |
| 2020/0028700 A1* | 1/2020 | Zaks | H04L 12/06 |
| 2020/0084211 A1* | 3/2020 | Wang | H04L 63/0853 |
| 2020/0153650 A1 | 5/2020 | Yang | |
| 2020/0259825 A1* | 8/2020 | Van Prooijen | G06K 9/00288 |

OTHER PUBLICATIONS

Distributed e-Voting using Smart Card Web Server. Kyrillidis et al. IEEE. (Year: 2012).

The eTRON Wide-Area Distributed-System Architecture fore-Commerce. Sakamura et al. IEEE Micro. (Year: 2001).

Multi-device Key Management Using Visual Side Channels in Pervasive Computing Environments. Batyuk et al. IEEE. (Year: 2011).

FR2946822. English Translation. Lecocq, Francois. (Year: 201 0).

USPTO, U.S. Appl. No. 16/457,498 complete file history.

USPTO, U.S. Appl. No. 16/457,498 Notice of Allowance dated Apr. 8, 2021.

* cited by examiner

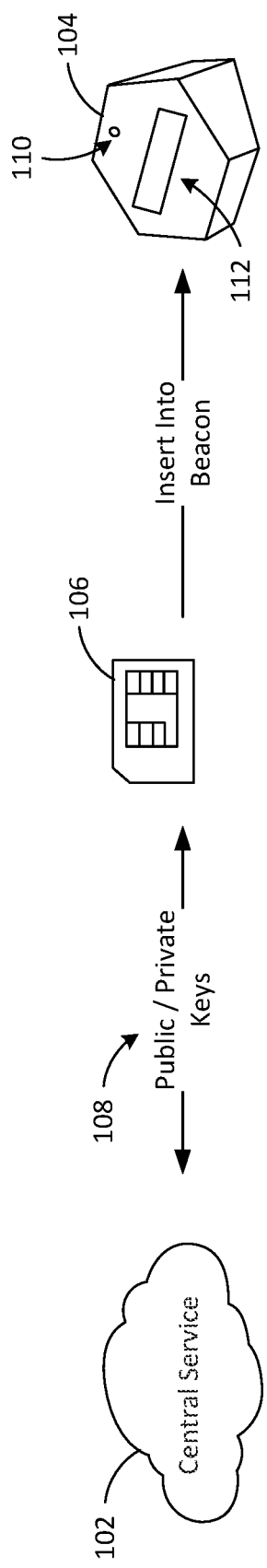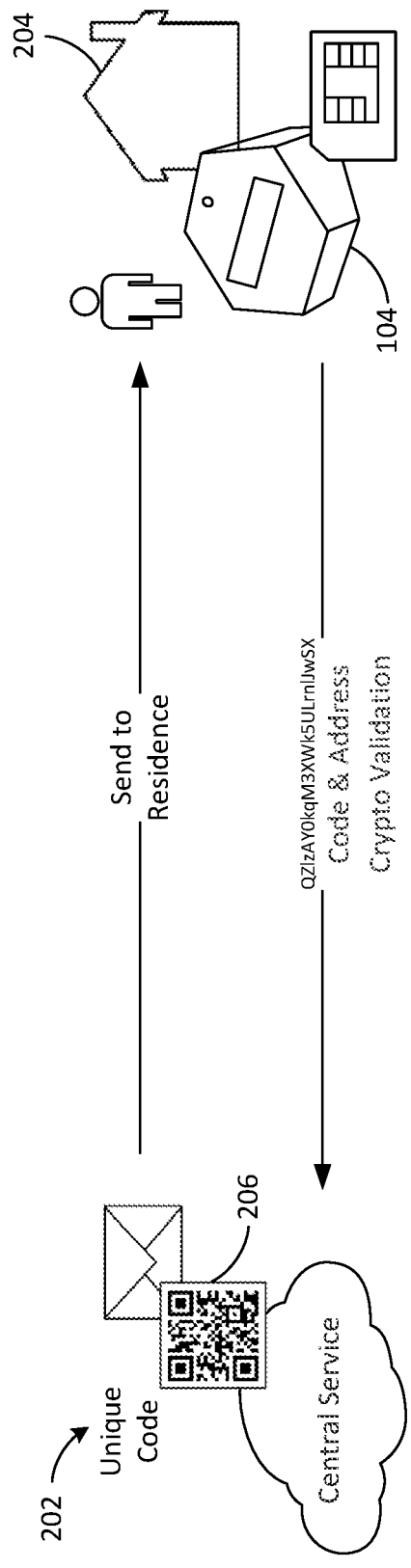

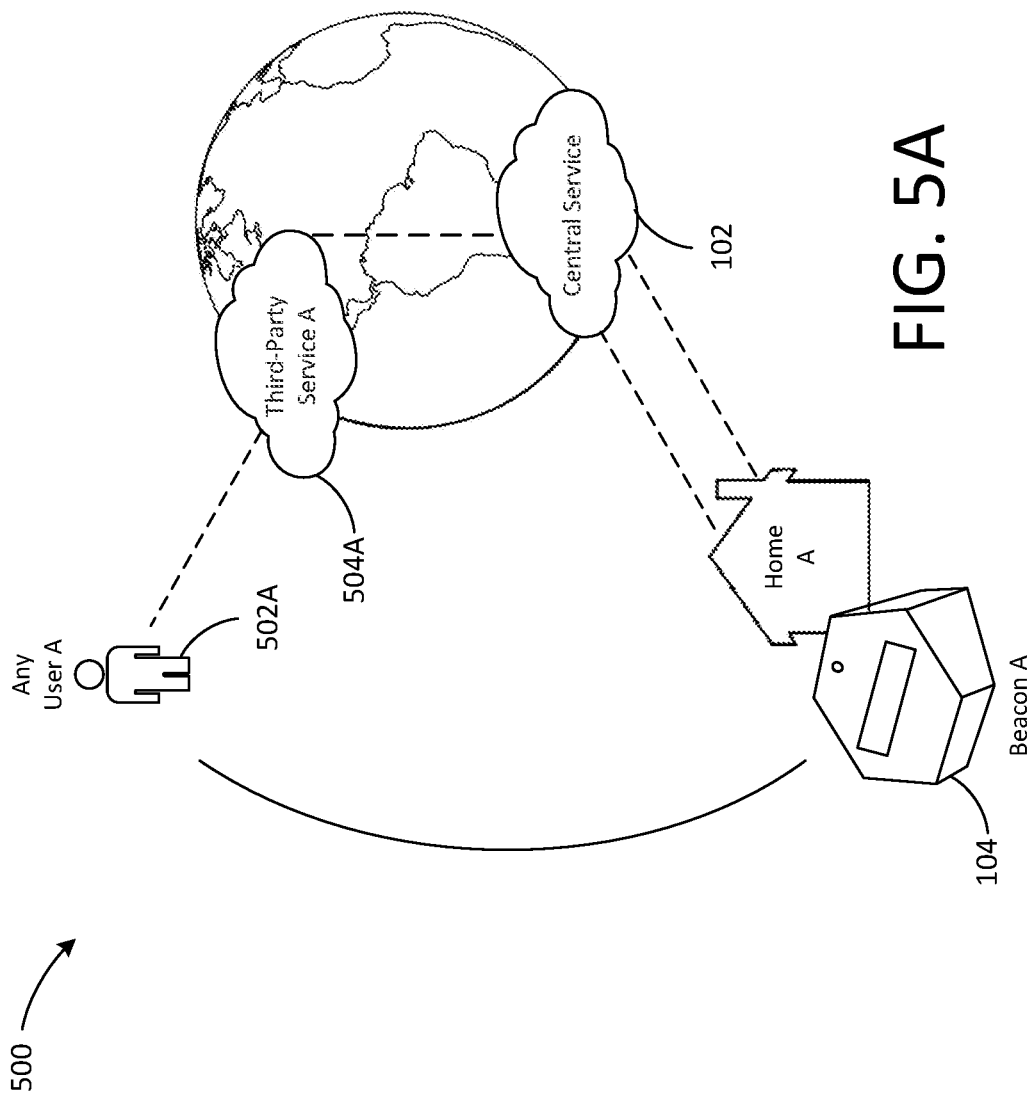

DIGITAL IDENTITY AUTHENTICATION SYSTEM

RELATED APPLICATIONS

The subject matter of this application is related to U.S. application Ser. No. 15/948,715, filed 2018 Apr. 9, U.S. Provisional Application No. 62/657,510, filed 2017 Apr. 7, and U.S. Provisional Application No. 62/483,016, filed 2017 Apr. 7 all of which applications are incorporated herein by reference in their entireties.

BACKGROUND OF THE INVENTION

With every Internet service becoming more and more personalized on an ever growing number of Internet-connected devices, authenticating online users continues to create significant security challenges for practically every organization that offers online services. Traditionally, authentication methods have been categorized according to specific authentication factors such as "something you know" (e.g. passwords), "something you have" (e.g. a security token) and "something you are" (e.g. a fingerprint). Several multifactor authentication approaches exist that use combinations of those factors to deliver stronger authentication than any single factor alone.

Each traditional factor has advantages and drawbacks rooted in the conflicting needs for stronger security (i.e. make it difficult for unauthorized persons to crack) and ease of use (i.e. make the authentication experience as seamless as possible for authorized persons). Hence, the quest continues for solutions that not only provide strong security, but do so while delivering seamlessness and great convenience for its users.

Adding to the challenges of traditional solutions is that security measures are commonly architected around individual services operated by independent providers. As a result, Internet users struggle to deal with a confusing array of technology solutions that vary widely from one online service to the next. Because users' personal information is increasingly stored by practically every provider for a variety purposes, this patchwork approach to authentication perpetuates, and sometimes exacerbates, personal privacy and security issues. Providers with the weaker approach become the obvious targets for identity theft, making users' personal information vulnerable in spite of stronger measures that may be adopted by other providers.

SUMMARY OF THE INVENTION

A system and associated methods provide digital identity and strong authentication management services for Internet users. The system includes a central, cloud-based, online service, referred to as a central service, which can manage user accounts. The system also includes dedicated, always-on, always-connected, cryptographically unique devices, referred to as beacons, located within the physical residences of its users. The central service associates each beacon with the residence address of its user by physically sending a unique address verification code by postal mail to the user's residence. The user presents the unique code to the beacon, and the beacon cryptographically confirms its identity and the unique code sent to the residence address back to the central service. The beacons can attest to users' identities and provide seamless strong authentication to third-party online service providers on behalf of those users.

Beacons can manage random aliases, passwords and cryptographic material on behalf of their users to enable secure, private, one-to-one connections among users, and between users and third-party services. As a cryptographically unique physical device hosted in the user's home, each beacon can be "something you have", but without requiring the user to carry it around everywhere, as it can be always accessible online through the central service. Once verified by postal mail, each beacon can leverage its user's home address as a real-world proxy of "who you are".

The system can support multifactor authentication that combines the best properties of traditional authentication factors into one seamless, yet strong digital identity. The system can replace the many passwords that users typically maintain ("something you know") with strong random strings that beacons can dynamically manage on behalf of their users. The system can provide end-to-end security and privacy among users and between a user and participating third-party services. The system can support anonymous trust and anonymity with accountability across participating services. The system can leverage a verified indication of "where you reside" to extend or supersede the traditional "something you know", "something you have" and "something you are" authentication factors.

BRIEF DESCRIPTION OF THE DRAWINGS

FIG. 1 illustrates a central service establishing a pre-existing cryptographic relationship with a beacon.

FIG. 2 illustrates a central service associating a user's residence address with a beacon.

FIG. 5A illustrates that the system can support instant single sign-on, end-to-end security and privacy between a user and a third-party service.

DETAILED DESCRIPTION

Figure 3:
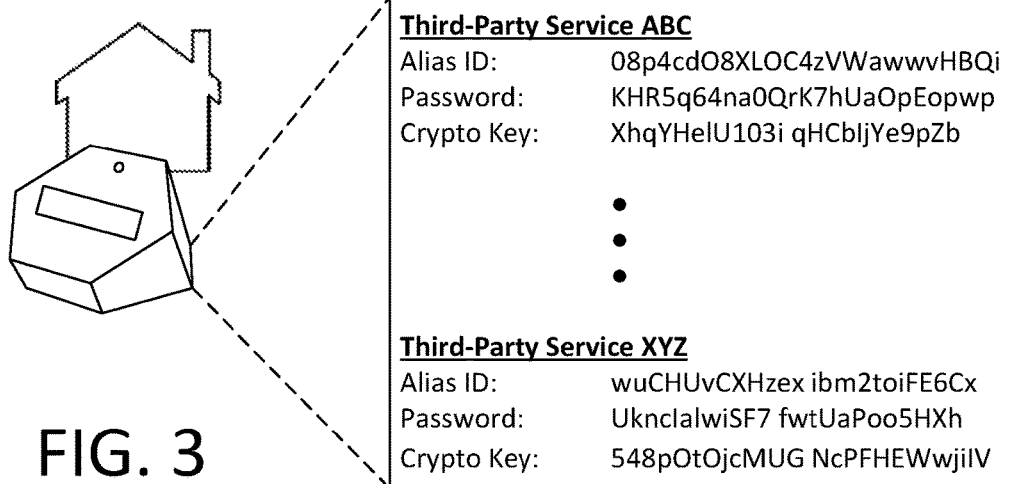
FIG. 3 illustrates that a beacon can create, store and dynamically manage random alias identities, passwords and any other cryptographic material such as keys on behalf of its users for a third-party service.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

A system includes a central, cloud-based, online service, referred to as a central service, which can manage user accounts. The system also includes dedicated, always-on, always-connected, cryptographically unique devices, referred to as beacons, located within the physical residences of its users. The term beacon is used in this specification merely as a fanciful name for a component of the system, and no association between the use of the term and dictionary definitions of the term or uses of the term in the related art is intended. Each cryptographically verified beacon communicates with the central service and acts as a trusted digital proxy to identify and strongly authenticate an associated user when accessing the user's account on the central service. The beacons can be configured to communicate exclusively with the central service. Through application programming interfaces (APIs) offered by the central service, third-party service providers can query identity information from the account and indirectly leverage the beacon to validate the user's authentication requests.

FIG. 1 illustrates how the central service 102 can establish a pre-existing cryptographic relationship with each beacon 104 in one embodiment. The central service can issue trusted and secure cryptographic cards or chips 106, and exchanges cryptographic material 108 (two-way public keys for instance) with them upon issuance. The trusted and secure cryptographic cards or chips can be inserted into beacons either at manufacturing or at a later time. Once deployed in users' homes, beacons can leverage the cards or chips to securely connect back to, and establish a cryptographically trusted and private connection with the central service. The beacon 104 can be equipped with an embedded camera 110 and/or a display 112 to support user input and/or output. To provide input to the device, the camera 110 can be used to scan machine-readable codes, such as QR codes.

The central service can associate or validate the user's address of residence on the account with a beacon hosted at the user's address by sending an initial unique activation code to the residence of the user by private postal mail (e.g. in a sealed envelope as illustrated in FIG. 2). Upon physical reception of the activation code, the user physically presents the code to the beacon, and the beacon cryptographically confirms the receipt of the code to the central service. A third-party service provider can also initiate a subsequent verification of the user's address of residence through the central service's APIs. To do this, the central service can generate a unique verification code and pass the code to the third-party service provider. The third-party service provider can then send the verification code to the residence of the user by private postal mail (e.g. in some official mailing like a bill or account statement) and the user can present the code to be beacon, which confirms receipt of the code to the central service.

In one embodiment, the system uses printed and mailed QR codes and a built-in camera in the beacon to scan the QR codes to associate or validate the addresses of beacons. Using a visual transmission mechanism, such as scanning printed QR codes, requires that the user have physical access to the beacon to present the code. Requiring physical access to a beacon kept in the user's private home adds stronger authentication to the system and precludes users who do not have physical access to the beacon from being associated with the beacon. Visual codes such as QR codes are very practical as they can be printed on practically anything (e.g. a printed bill), or can be displayed on any device screen (e.g. a smartphone). Consumers have also grown accustomed to the act of scanning codes when grocery shopping or boarding airplanes.

FIG. 2 illustrates how the central service can associate a user's residence address to his or her beacon. The central service sends a unique code 202 to the user's residence 204 by postal mail. In FIG. 2, the code 202 is encoded in a mailed QR code 206, but other ways of physically sending the unique code to the user's residence can be used. Once the user receives the unique code, they present it to the beacon for input. If a QR code is used, the code can be scanned by the beacon's embedded camera 110. Other ways of physically presenting and entering the unique code into the beacon can alternatively be used. Once the beacon has received the code, it uses cryptographic techniques to validate the reception of the unique code with the central service and thereby complete the association of the beacon with the residence address.

FIG. 3 illustrates that each beacon can create, store and dynamically manage random alias identities, passwords and any other cryptographic material such as keys on behalf of its user for a third-party service. FIG. 3 shows, by way of example, three types of data elements including Alias ID, Password, and Crypto Key for each of two third-party services. This example, however, should not be understood as limiting the type or the amount of information that beacons can manage for each third-party service, or the number of services.

In one embodiment, users can securely register Internet-connected devices, such as personal computers, laptops, tablets, phones or Internet of things (loT) devices with their accounts on the central service. To register a device, the user navigates to an online portal hosted by the central service and goes through a device-specific registration. To securely confirm the registration of the device on the account, the central service sends a unique electronic code to the beacon associated with the account. The user then uses the device being registered to enter that unique code on the online portal to complete the device registration. The central service then associates the device with the user account for later device verifications (adding additional trust and security, i.e. a familiar device that the user explicitly registered) whenever the user seeks access to third-party services. In one embodiment, some unique device identifier, such as MAC address, cookie or other identifier, can be conveyed through this transaction from the device to the central service to enable the central service to recognize the device as registered for future uses.

Figure 4:
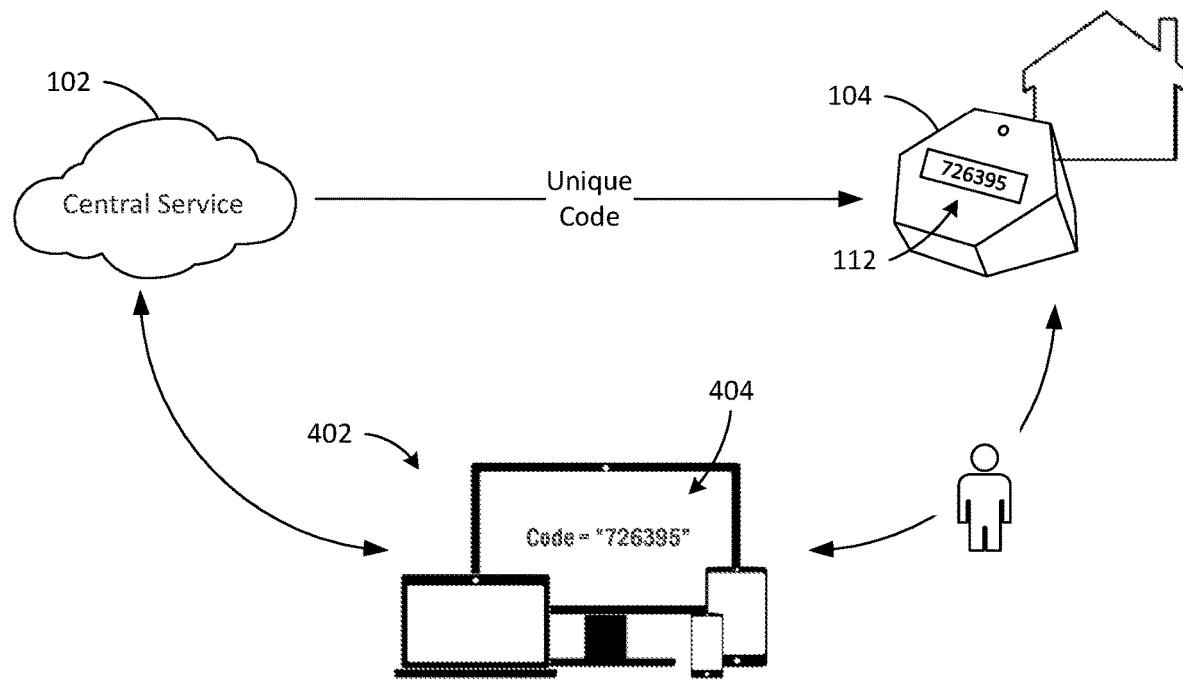
FIG. 4 illustrates how users can register Internet devices with the central service through a beacon.

FIG. 4 illustrates how users can register Internet devices with the central service through a beacon in accordance with one embodiment. The central service 102 and the beacon 104 agree on a unique random code to confirm the registration of a device. As illustrated in FIG. 4, the unique random code can be, for example, a 6-digit number displayed on a display 112 on the beacon. The user then enters the code on the central service registration portal 404 through the device to validate and confirm the device registration. A unique device identifier, such as MAC address, cookie or other identifier, is conveyed through this transaction to enable the central service to recognize the device as registered for future uses. Other ways to communicate the unique random code to the user or to the device 402 through the beacon can be used. For example, the beacon can display a QR code on its screen that can be scanned by a device such as a smartphone or tablet to register the device.

FIG. 5A illustrates that the system 500 can support instant single sign-on, end-to-end security and privacy between a user A 502A and a third-party service 504A in accordance with one embodiment. When user A accesses third-party service A, service A interacts with the central service 102 to seek identity and credential information from the user account on the central service. If user A is using a registered device, the central service can retrieve the user A account based on the unique device identifier that was set during registration of the device. User A may or may not be prompted to provide credentials to the central service based on user security preferences for the specific third-party service A. If user A is not using a registered device, the central service can require user A to provide his or her identity to access their account. In one embodiment, user A's identity can be their real name and home address. Using a user-supplied name and address, the central service can connect to beacon A 104A hosted in the home A of user A, at which point user A can provide their credentials to be verified by beacon A. Beacon A then transmits the results of the authentication to the central service 102. If authentication with beacon A is successful, beacon A can provide the central service with information it holds for third-party service A on behalf of user A. This information can include, for example, a specific alias ID, password and/or any other cryptographic material to establish a trusted and/or private connection between user A and service A. Should the third-party service A need any further assistance from the central service for any other security and/or privacy purpose, both services have complete context to do so transparently on behalf of user A.

Figure 5B:
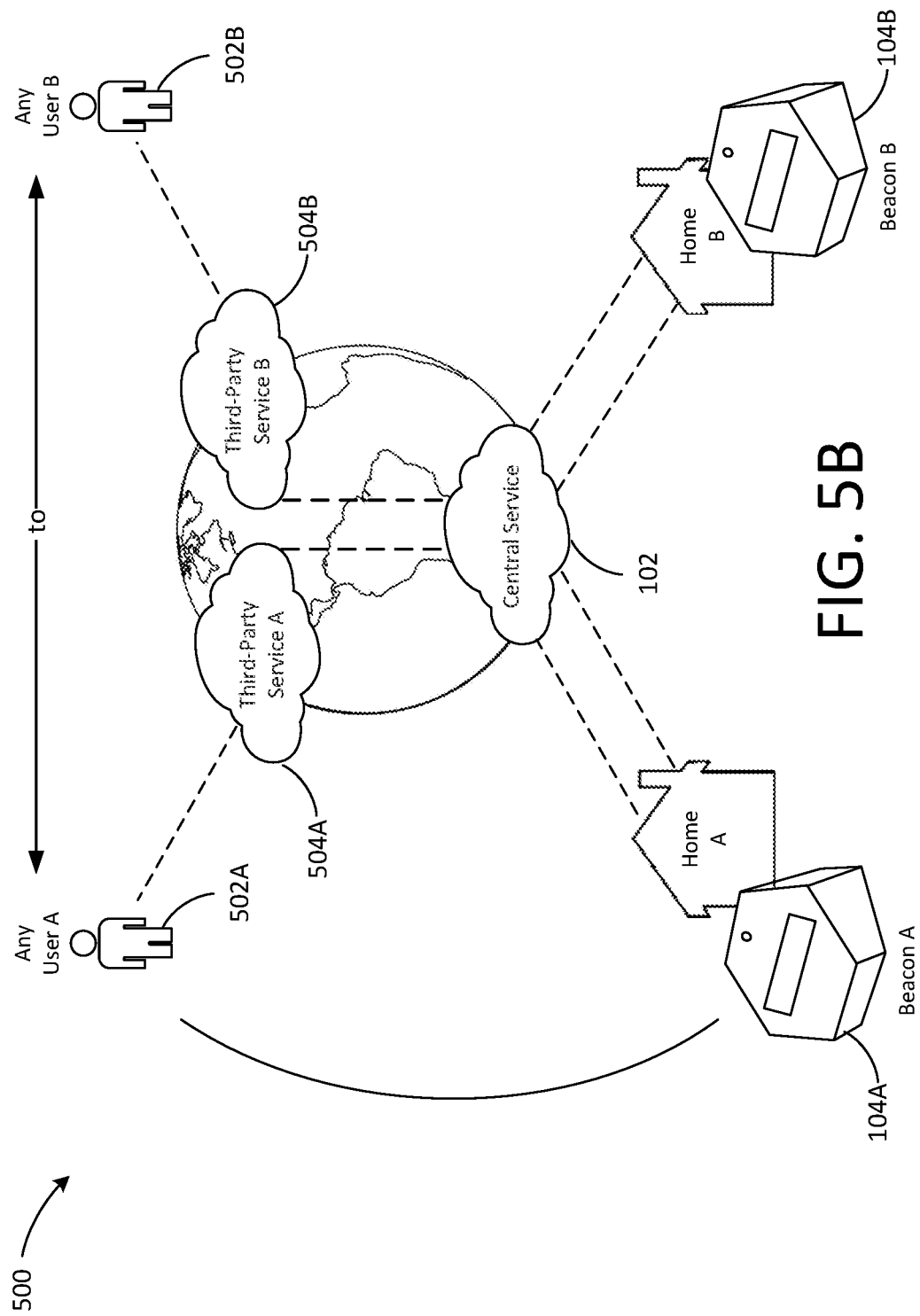
FIG. 5B illustrates that multiple users using multiple third-party services can obtain end-to-end security and privacy across a combination of users and third-party services.

FIG. 5B illustrates how any multiple users using multiple third-party services can enjoy end-to-end security and privacy across any combination of users and third-party services. FIG. 5B shows user A 502A accessing third-party service A 504A and user B 502B accessing third-party service B 504B, each in accordance with the procedures illustrated in FIG. 5A. Note that FIG. 5A can be generalized to any number of users and third-party services. Once users A and B are respectively granted access to third-party services A and B, the central service 102 is aware of the full context for each user across services A and B and can communicate with beacons A and B to equip both users with whatever cryptographic material they need to establish an end-to-end secure and private connection directly between user A and B.

In one aspect, the system can support seamless and strongly authenticated single sign-on across a third-party service from the very first interaction. A user can point third-party services to use their account on the central service. The central service can instruct the user's beacon to generate unique user identities, credentials and any other necessary cryptographic materials to establish a completely private, secure end-to-end digital relationship between the user and the third-party service.

In one aspect, the system incorporates a novel combination of authentication factors including a verified residence associated with an online beacon, which can be referred to as "where you reside". By associating an always-on, always-connected beacon to the physical residence of a user, the system creates a combination of "what you know", "what you have" and "what you are". The beacon can be configured to store a large number of dynamically changing credentials which can replace passwords that users traditionally have to "know". By placing and keeping the beacon in the user's residence, the user "has" the beacon in his or her private possession without having to actually carry it around. By associating the beacon with the user's residence address, the system leverages the user's home address as a legal proxy for who each user "is". Unlike other multifactor solutions, the novel combination of authentication factors can be effected seamlessly and transparently to the user as all identity and authentication transactions between third-party services, the central service, and the beacon can happen in real time in the background.

In one aspect, the system can provide seamless identification and strong authentication of any beacon user to a third-party service. In one aspect, the system can provide end-to-end, secure and private connections between any two beacon users within one or across multiple third-party services. In one aspect, the system uses actual addresses of residence in the physical world, as verified by private postal mail, as anchor points for users' digital identities, with aliases managed and maintained by users' beacons in their homes. The accounts created on the central service, therefore, can be universal, neutral and completely independent from third-party services.

In one aspect, the system can leverage a cryptographically unique beacon to manage all of a user's aliases and credentials across third-party services. The system can therefore support "anonymity with accountability" which is a highly desirable property for all online services. In one aspect, each beacon can create and keep track of aliases across third-party services, and therefore users can access those services without necessarily disclosing their real-life identity. In one aspect, all of a user's aliases can be tied to their cryptographically unique beacon, which beacon is itself tied to the user's real-life identity through a home address. Accountability rules can therefore be enforced to combat anonymous abuses on any third-party service.

In one aspect, the cryptographically unique beacon can manage all of a user's aliases and credentials across third-party services. The system can therefore support "trustworthy anonymity" which is a highly desirable property for all online services. In one aspect, each beacon can strongly authenticate its user across all third-party services even when using different aliases, and therefore algorithms can be used to aggregate and calculate a given trust score for that user across all such services. Such a trust score can be used to qualify the user to any other third-party service even when the user is using an anonymous alias. This trust score can be used to support trust across the Internet, empowering all users and third-party service providers to interact in confidence based on anonymous, yet auditable trust scores.

Alternative and Additional Embodiments

I. Overview

In one embodiment, a system includes a cloud-based central service in communication with user residence located dedicated cryptographic servers, called beacons, to create an end-to-end, cryptographically trusted and secure network for all participants. Each beacon can be based on trusted computing technology and can include hardware-based cryptographic capabilities. By collaborating in a beacon-to-beacon fashion (i.e. peer-to-peer between beacons), the network can create, back-up, transmit, and share cryptographic material without ever exposing secret or private keys to non-trusted parties, i.e. the Internet, the Web or the cloud. Even the central service can be kept blind of the actual cryptographic material managed by the beacons.

Cryptographic security is traditionally implemented on a third-party domain-centric basis, with mainstream consumers being the remote participants in the system. This requires the explicit participation of end-users and puts the complexity of managing the lifecycle of digital certificates and cryptographic material in the hands of non-technical people. This is a fundamental problem with all cryptographic schemes in general. Cryptography is unforgiving: if/once your private or secret keys are compromised, your data may be compromised or lost forever with no recourse. This has either blunted the security strength of cryptography-based solutions because weaker fallback and/or recovery mechanisms were required, or it has completely prevented mainstream adoption of those solutions as most consumers could not possibly become cryptography-savvy.

Unlike the traditional approach, the system can be architected around the end-user's own private domain, i.e. their own home, with third-party organizations being the remote participants in the system. This bootstraps the enrollment process for mainstream consumers, and enables the system to automate the management of the lifecycle of digital certificates and cryptographic material on their behalf for all digital interactions with any participating third-party entity. This enables a single, one-time, consumer-friendly enrollment by the consumer, and automatically propagates the capabilities of the system to all participating enterprises and third-party services. It eliminates the need to put "trust" in a central identity provider such as the government or any of the powerful Internet corporations who manage identities, authentication and consumer data centrally, in their own cloud-based solutions.

The foregoing can be achieved by encapsulating management of cryptographic material in a consumer-friendly, trusted computing device that mainstream consumers can simply plug into their home network and activate through a simple, fool-proof process. It wraps the enrollment process into an intuitive and user-friendly experience similar to what consumers have come to expect from their consumer electronics devices: plug it in, activate it, scan QR codes and you're done. It also provides users natural self-service recovery methods based on having privileged physical access to their own beacon in their own home, which is the most natural, private and secure way that we all protect our personal belongings in the physical world. The system hence combines the strongest cryptographic security with the most natural and consumer friendly physical security for recovery procedures.

The system can leverage trusted computing techniques and the end-users' physical access to their own beacon to propagate transitive trust to all participants, as discussed below.

a. The central service can trust the beacon by design (based on pre-established cryptographic trust established at manufacturing time), and each beacon can remotely attest to its hardware and software integrity.

b. The beacon can trust its users by proximity as it is installed in their homes and requires physical access for specific account management operations, thereby shutting out anyone who is kept out of the users' home. Requiring physical access to a stationary, residence-based, always-connected beacon for pairing and sensitive operations physically limits the attack surface of each and every beacon.

c. By transitivity, the central service can trust that the users of a given beacon belong to a given household that has strong incentives towards protecting the beacon itself and the digital information they put in the system. Users have control over their own data through their beacon, and their beacon has intrinsic attributes of trust because of its physical/stationary/always-connected/limited user base within the household.

d. Conversely, end-users can trust their beacon by design since beacons can be configured to run publicly disclosed open source software to provide transparency. Beacons can trust the central service by design (pre-established hardware-based cryptographic trust at manufacturing time). By transitivity, end-users can cryptographically trust the central service.

e. Participating third-party entities, be they organizations or other users, can similarly trust the central service. Employees of organizations can be participants on the network in both their consumer and employee capacity. By transitivity again, the central service and the beacons can connect any two participants with end-to-end data security and trust. This enables distributed trust without requiring 1-to-1 relationships/contracts for basic trust to be established between participating organizations and/or end-users.

f. Beacon activation can require home address verification by physical mail to prevent impersonation and provide familiar and legally-protected activation, validation and recovery mechanisms via postal service (i.e. send unique codes to residence in sealed envelope). This uses physical residence of a user as a proxy for the user's digital identities or aliases (just, like utilities, bank, credit card companies . . . ) and makes this capability available to any participant in the network. It provides a built-in "Know Your Customer" starting point without need to share sensitive personal information (SSN, etc.) to any central gate keeper.

g. Beacons can require physical access for all security-sensitive operations, such as delegating agency to other agent devices, which can be used by a user for authentication/identification.

Beacons can include some or all of the following hardware capabilities: hardware and software trusted computing capabilities, discussed below; always-on Wi-Fi connectivity; a camera capable to scan high-capacity QR codes; and a visual and/or auditory mechanism(s) to provide feedback to the user, such as display, LEDs, speaker, buzzer.

Beacons can be enrolled with the central service at manufacturing time so that each beacon can be uniquely and remotely verifiable in a tamper-proof way. Each beacon can be designed using a "trusted computing" architecture or a secure cryptographic coprocessor. The secure coprocessor can protect private key(s) from ever being exposed in the clear outside of the physical silicon chip, which is the cornerstone or private and secret keys that never leave their residence domain and can cryptographically protect any other data and/or cryptographic keys in a hierarchical and/or recursive fashion. The secure coprocessor can feature secure memory and processing capabilities to execute cryptographic operations out of reach of any external hardware and software system, which is critical to reduce the attack surface on the most critical cryptographic materials. The secure coprocessor can feature hardware violation/tamper detection and reporting capabilities, The secure coprocessor can feature one-time programmable memory ("e-fuses") that is used to "burn" cryptographic material into the silicon of each processor in ways that can never be altered. The cryptographic material enables the processor to verify the digital signature of the initial boot code, thereby guaranteeing that only the code signing authority (essentially the central service) can produce software updates for this specific physical processor. This is called Verified Boot.

The secure coprocessor can support remote attestation of the integrity of both hardware and software to the central service and/or to other beacons and/or other third-party participants in the network. To achieve this, each beacon will have keys securely configured with a Device Public/Private Key Pair signed by a Certificate Authority at manufacturing time.

A user can acquire a beacon through various distribution channels, and can bring the beacon in their most private physical space (usually their home) in a way that restricts physical access to the beacon from most of the world. Delegation of authority to other portable devices can be effectively limited by requiring physical access to the beacon, and without physical access to the beacon in a user's home, other users or devices cannot access or leverage the beacon's authorization or authentication capabilities.

II. Pre-Established Cryptographic Relationship at Manufacturing Time

As part of the factory software initialization, each beacon can create a unique, completely random Device Private/Public Key Pair in their secure hardware enclave. In one embodiment, by design, the Device Private Key cannot be extracted from the silicon in which it has been created. Each beacon transmits its Device Public Key and full certificate chain to the central service. The central service hashes the Device Public Key and uses the hash value as the Device Public Key Locator. The central service stores the Device Public Key using the Device Public Key Locator as its pointer. The Device Public Key Locator can be encoded in a QR code that may be printed on a label and attached on the bottom of the unit. Alternatively, the Device Public Key Locator can be displayed by the beacon itself on a built-in screen. The beacon can display its Device Public Key Locator when it is in a mode that requires the user to transmit the Device Public Key Locator electronically to the central service.

III. Beacon and Central Service Architecture

Figure 6:
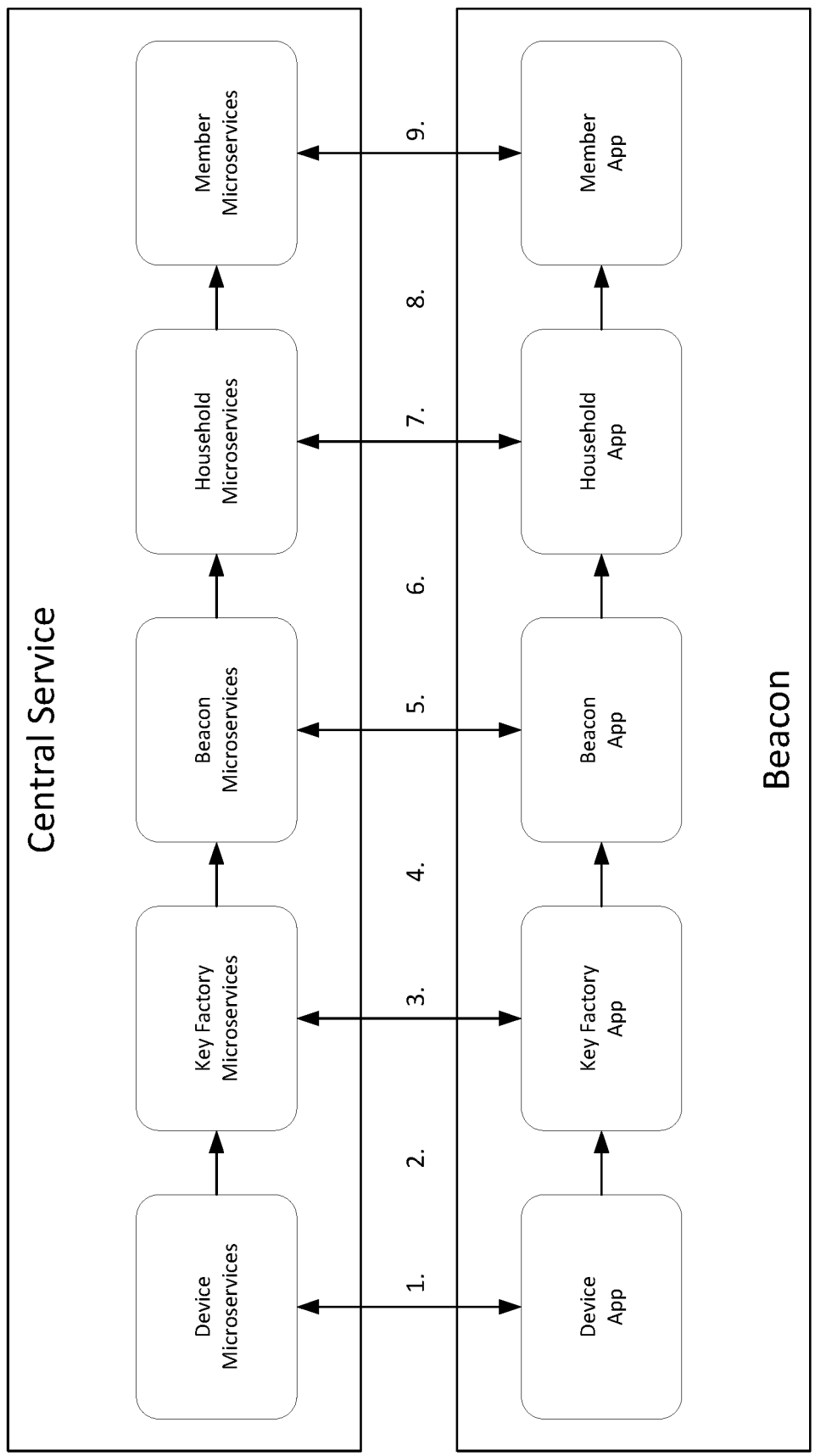
FIG. 6 illustrates a beacon and central service architected as partitioned and isolated hierarchical applications and micro-services in accordance with one embodiment.

FIG. 6 illustrates a beacon and central service architected as partitioned and isolated hierarchical applications and micro-services in accordance with one embodiment. The goal of this approach is to leverage OS and microservices isolation to minimize attack surface, contain the impact of potential vulnerabilities and lock down all end-to-end interactions from the hardware up. Such functional segmentation limits roles, authority and authorizations of each app, i.e., analogous to network segmentation.

Apps and microservices can have need-to-know-only capabilities and data, and can be configured to only interact with cryptographically authenticated entities and microservices of their own level. Trust can be propagated from the hardware level to each subsequent level, with each level registering and launching the next sequentially.

Upon initial launch of an app on the beacon, each app can create a unique Private/Public Key Pair and register its Public Key with the corresponding microservice in the central service by communicating through the already verified and trusted upper-level app and microservice. This can preclude any external registration at any level that did not start with a valid device app registration. This process can be carried out at manufacturing time, before the beacon leaves the factory.

Once deployed in the field, each beacon can power up and launch one level at a time. Once a level is authenticated and validated (i.e. not repudiated), it can then unlock the next level sequentially. This enables the central service to revoke access to beacons that have become suspicious or have been compromised, and to prevent any of the apps on those revoked beacons from unlocking their own content on the beacon, which in turn prevents them from accessing any of the microservices on the central service. This can be achieved by having the microservice at each level keep some secret (a cryptographic key, a "password" . . . ) necessary to unlock the app of the next level. The microservice at each level can be configured to only transmit its secret to the corresponding app on the beacon upon successful authentication and verification of that app. The app can then launch and enable the next-level app, and the microservice can then inform the next-level microservice that a corresponding app is about to get launched and will contact it. This rigorous launch process allows the central service to detect, flag and alarm any abnormal behaviors from suspicious beacons, which further constraints attack vectors and limits attack surfaces.

IV. Distinct Hierarchical Key Structures for Apps and Households/Members

To enable segmented/partitioned cryptographic authentication of each app on each beacon with their corresponding microservices, each app can create a Private/Public Key Pair upon first initial launch (most likely, but not necessarily, at manufacturing time before leaving factory) and register its Public Key with the corresponding microservice in the central service by communicating through the already verified and trusted upper-level app and microservice.

Independently of this device and app-specific hierarchical key structure, each beacon can create unique Private Public Key Pairs and Secret Keys for each Household, each Member and each Member's Relationships created on the beacons. This separation of cryptographic key structures enables the secure migration of Households, Members and Relationships cryptographic keys from one beacon to another as needed.

Private/Public Keys can be used to encrypt, sign and verify data that belongs the specific entity that controls the Private Key. Secret Keys can be used to encrypt data and/or other Secret Keys in a way that does not tie the data to a specific entity. To tie a Secret Key (that protects data or other Secret Keys) to a specific entity, that Secret Key can be encrypted with the Public Key of the entity, so that only that entity can retrieve the Secret Key (and all the data and other Secret Keys that it protects) with its Private Key.

V. Chains of Trust

Figure 7:
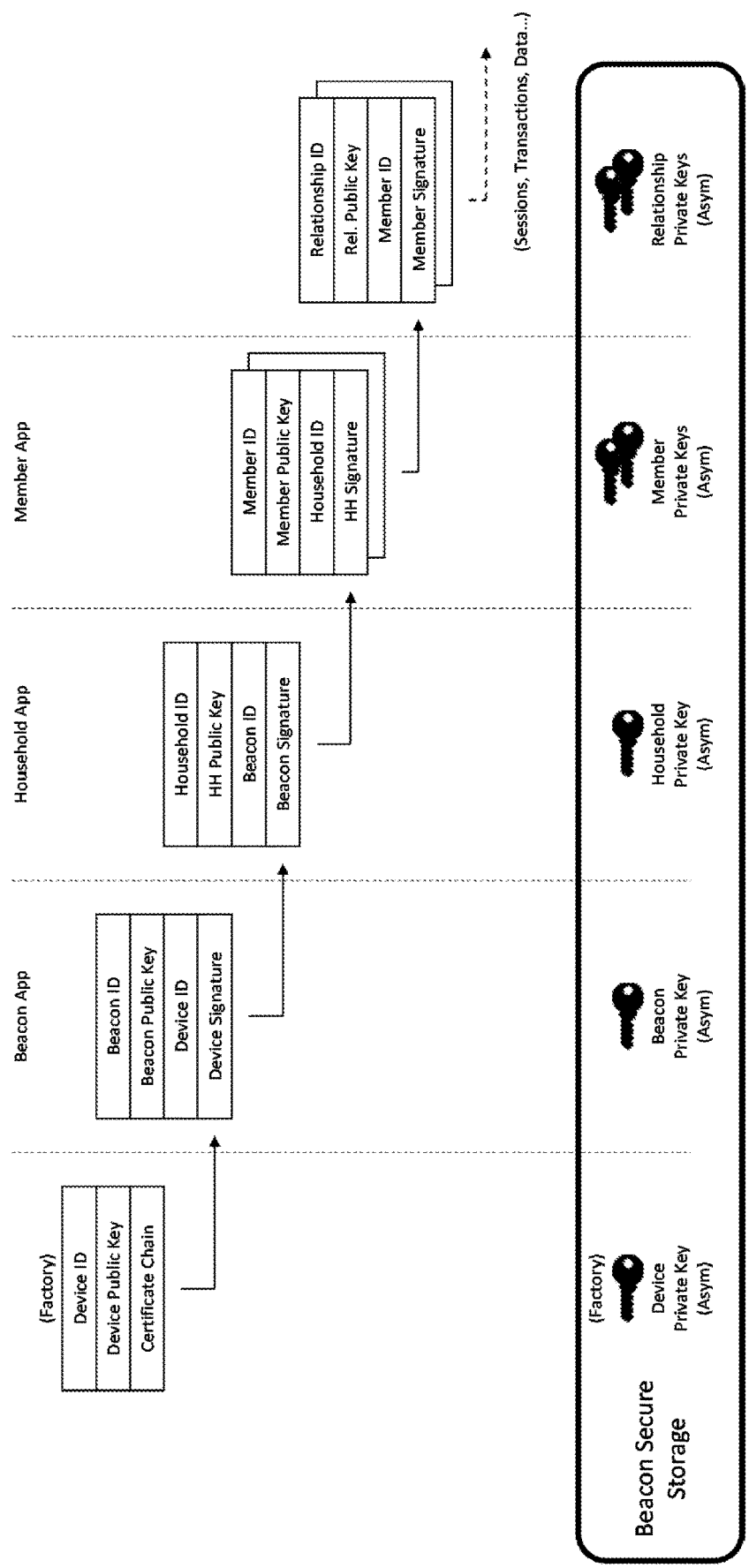
FIG. 7 illustrates creating a beacon's chain of trust in accordance with one embodiment.

FIG. 7 illustrates creating a beacon's chain of trust in accordance with one embodiment. Because each beacon can be configured to have exclusive access to all the Private Keys for its various apps and for the Households and Members it manages, each beacon can be able to create ad-hoc chains of trust, i.e. certificate chains, for all of the Key Pairs it manages. Such certificate chains can link all the way back to the Device Key Pair that was set in the factory, at manufacturing time. This means that any Key Pair generated by any valid beacon can be verified by any external entity, including the central service, other beacons, and/or participating third-party entities.

VI. Use of Paired Phone/Device by Household Member to Authenticate into 3rd Party Service In one embodiment, the system can provide identity and authentication services to any Relying Party (RP) app or website in a way that is unique, yet compatible with the OpenID Connect (OIDC) industry-standard protocol. The unique aspect of the system is that the beacon, in cooperation with the central service, can act as the "Identity Provider" (IdP) in the OIDC flow. This can eliminate the need for any centralized repository of all user credentials by distributing and delegating the actual identity and authentication functions to the beacon themselves, in the physical residences of their users.

The system can also eliminate the need for users to authenticate with a username and password by enabling them to establish a secure connection between the Relying Party and their beacon by scanning a QR code with a phone app on a paired device. This can eliminate the risks of phishing as the user is no longer entering any credentials on the RP website/app, but rather enables the RP website/app to securely find its way to the beacon to carry out the identity and authentication transaction in an end-to-end, machine-to-machine way, and in the background.

Figure 8:
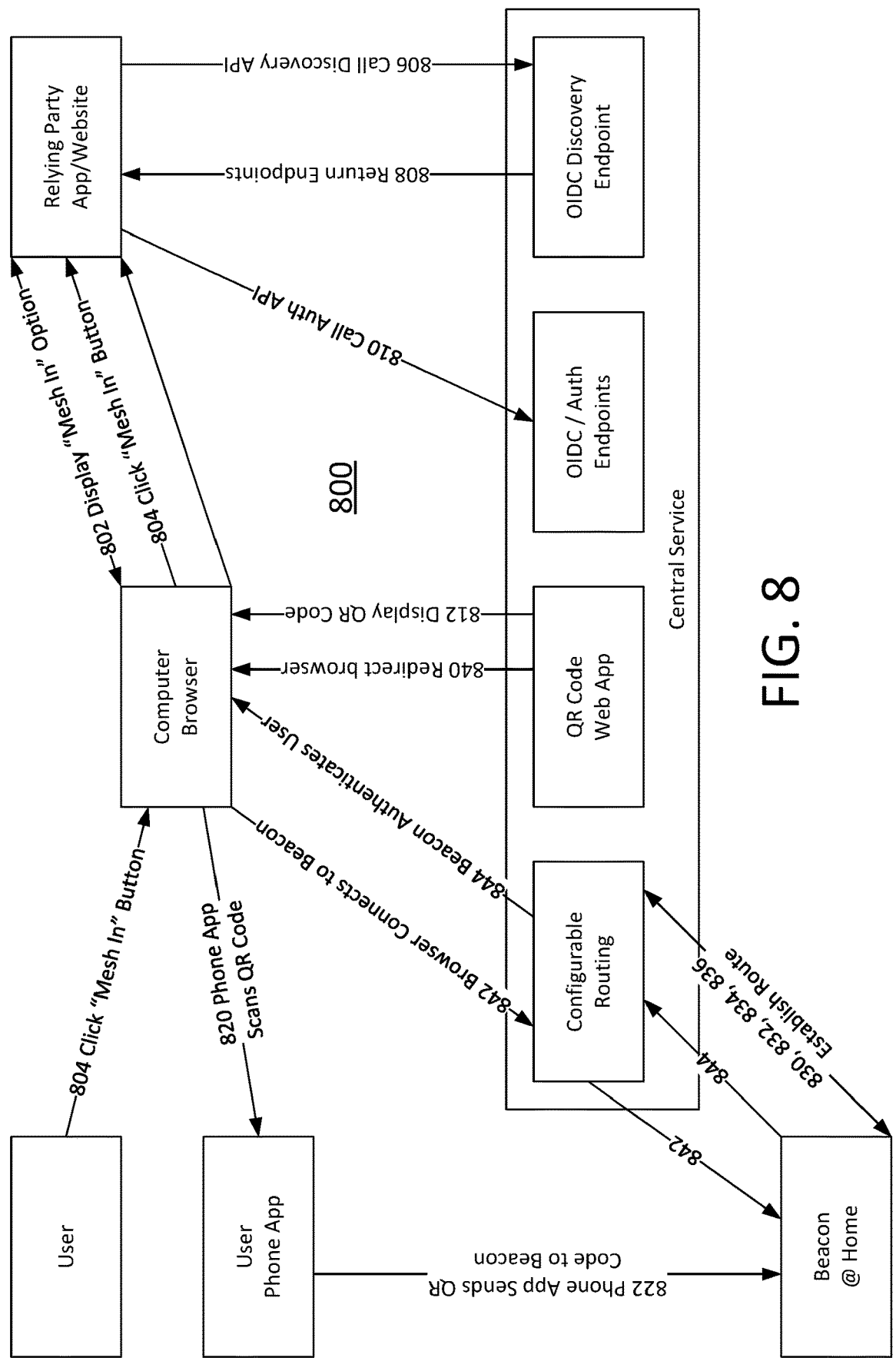
FIG. 8 illustrates a process for authenticating users to third party services using a paired device in accordance with one embodiment.

FIG. 8 illustrates a method 800 for authenticating users to third party services using a paired device in accordance with one embodiment. FIG. 8 shows interaction arrows between functional components with numbered captions that correspond to steps described below.

At a step 802, a relying party participating website displays on a user's computer or device an option to "Mesh In" (similar to "Login with Google"), meaning to log in using the system. This option can be displayed in the form of a selectable button, for example. At a step 804, the user selects the "Mesh In" option, which initiates an OpenID Connect flow. The user does not need to enter any ID or credential on the website.

At a step 806, the website, acting as a Relying Party in the OpenID Connect protocol, calls the/discovery API on an end-point handled by the central service. At a step 808, the central service creates a unique Discovery Route ID and returns OpenID and OAuth endpoints to the website. The endpoints that are routed to the beacon (getToken, getUserInfo) contain the Discovery Route ID in the URL hostname. At a step 810, the website, acting as a Relying Party in the OpenID Connect protocol, calls the /auth API on an endpoint handled by the central service.

At a step 812, the central service redirects the request to a webpage that loads an in-browser Web App that will display a QR code created specifically for this session. Rather than authenticating with a third party authentication service like Google or Facebook that ask for credentials, the user's own personal beacon can handle authentication with a QR code. In this way, there is no opportunity for "phishing". The system relies on a personal domain and not a third party domain (like Civic) which facilitates hierarchical identities on physically separate devices that service "one household at a time", with simplicity and a lower attack surface that allows the system to observe abnormal behavior. The system can allow individuals to physically assert their online identity v. needle-in-haystack attackers.

Further in the step 812, the Web App displays the QR code and connects to the central service to receive events. The QR code includes a Validation ID returned by the central service, the Discovery Route Id, and an Authentication Session ID generated by the Web App in the browser. The Authentication Session ID need not be exposed to the central service. The duration of session ID/level of authentication (e.g., need for second factor/biometrics) can be set by the relying party.

At a step 820, the user opens the phone app, which securely connects to the beacon it was paired with, and uses the phone app to scan the QR code displayed by the Web App. At a step 822 the phone app transmits the QR code to the beacon for verification, preferably using end-to-end encryption. Optionally, the phone app or the relying party can require the user to enter the PIN that was previously set on the user account to further verify the identity of the user of the phone app.

At a step 830, the beacon creates a Relationship ID and a Relationship Public/Private Key Pair for this Relying Party (if one does not already exist for this specific Relying Party) and stores the Authentication Session ID. At a step 832, the beacon creates a Discovery Route Public/Private Key Pair for this Relying Party and stores the Authentication Session ID. At a step 834, the beacon notifies the central service that the validation is complete for the given Validation ID and passes the DiscoveryRouteId.CentralService.com URL to the central service. At a step 836, the central service passes the DiscoveryRouteID.CentralService.com URL to the Web App in the browser, and configures itself to route the newly created subdomain to the beacon.

At a step 840, the Web App redirects the browser to DiscoveryRouteiD.CentralService.com/auth and adds its Authentication Session ID. At a step 842, the browser securely connects to DiscoveryRouteiD.CentralService.com which is now configured to be routed to the beacon. At a step 844, the beacon validates the Authentication Session ID and returns an authentication token to the browser, which in turn authenticates the user to the Relying Party.

Once a secure connection is established between the RP and the beacon, subsequent communications can take place through that connection to transmit additional data with end-to-end security and privacy. Such data can be anything, and may include personal profile information and/or encryption keys enabling the sharing of encrypted bulk data through the "blind backup" service, discussed below.

If multiple users connect and authenticate in this fashion to the RP website/app, the RP website/app can facilitate the establishment of secure connections between the beacons of these users. This enables end-to-end secure connections between any two-or-more participants in the network.

VII. Creation and Chaining of Identifiers, Secret Keys and Descriptor Locators

The system can manipulate concepts that are often related and that can benefit from being derived from one another while maintaining secrecy between some of them. One way of achieving this is through the use of a one-way function. A one-way function, such as hashing, enables a pseudo-random value to be derived from an original value. Knowing the original value and the function used to calculate the derived value, any entity can recalculate the derived value. Knowing the derived value only, however, does not enable anyone to calculate the original value. For instance, the system can use this property to relate the concepts of Identifiers (for households or members, for instance), of Secret Keys and of Descriptor Locator in the central service.

Figure 9:
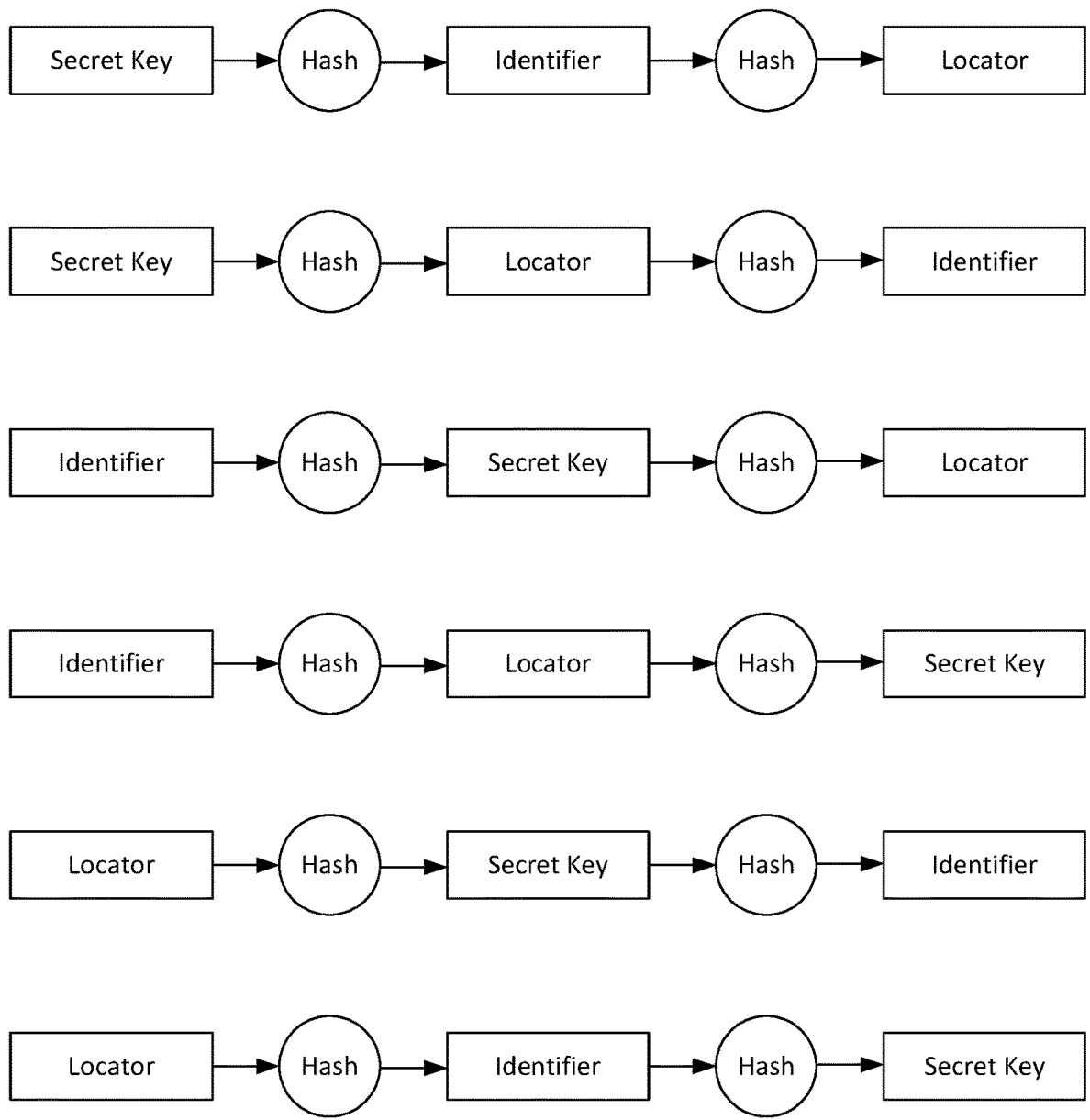
FIG. 9 illustrates various combinations of concepts that can be related by one way hash functions.

FIG. 9 illustrates various combinations of concepts that can be related by one way hash functions. In the first one, knowing the Secret Key enables the calculation of an Identifier (by hashing the secret key), but revealing the Identifier does not enable the reverse calculation of the Secret Key. Likewise, knowing the Identifier enables the calculation of a Locator, but revealing the Locator does not enable the reverse calculation of the Identifier, or of the Secret Key. All other combinations, and any such combinations of more than three concepts, are contemplated for their respective benefits.

VIII. Hierarchical and Recursive Key Encryption and Backup

The system can support cloud-based back up of cryptographic material created within each beacon, since beacons are electronic devices that can fail or become disconnected at any time. The backup process can maintain the security and privacy of every context within which the cryptographic material is used by relying on encryption.

One challenge in encrypting cryptographic material to protect it from unauthorized access is that it shifts the protection and access control requirements to the keys that were used to encrypt the original keys, i.e. more cryptographic material. This recursive process of cryptographic protection of cryptographic material can be tamed by adopting a hierarchical approach to key management. Beacons can be configured to use such an approach by hierarchically and recursively encrypting Households', Members' and Relationships' cryptographic material. The hierarchical approach can enable the recursive recovery of the cryptographic material by the appropriate apps at each level.

Recursive backup can be implemented as follows in accordance with one embodiment. Upon creation of a new Household Private/Public Key Pair, the Household app creates a Household Private Key Recovery Secret Key (HPKRSKey). The Household app encrypts the Household Private Key with the HPKRSKey, and sends the Encrypted Household Private Key to the Household microservice for backup in the central service. The Household app gives the HPKRSKey to the beacon app for backup. The beacon app backs up the HPKRSKey through the beacon-to-beacon backup mechanism (explained separately). Upon creation of a new Member Private/Public Key Pair, the Member app creates a Member Private Key Recovery Secret Key (MPKRSKey). The Member app encrypts the Member Private Key with the MPKRSKey, and sends the Encrypted Member Private Key to the Member microservice for backup in the central service. The Member app gives the MPKRSKey to the Household app for backup. The Household app encrypts the MPKRSKey with its Household Public Key, and sends the Encrypted MPKRSKey to the Household microservice for backup in the central service. Upon creation of a new Relationship Private/Public Key, the Member app encrypts the new Relationship Private Key with its Member Public Key and sends the Encrypted Relationship Private Key to the Member microservice for backup in the central service.

Recursive recovery can be implemented as follows in accordance with one embodiment. The recovery beacon app retrieves the Household Private Key Recovery Secret Key (HPKRSKey) through the beacon-to-beacon recovery mechanism (explained separately). The beacon app hands over the HPKRSKey to the Household app. The Household app retrieves the Encrypted Household Private Key from the Household microservice in the central service. The Household app decrypts the Encrypted Household Private Key with the HPKRSKey to retrieve the Household Private Key. The Household app authenticates the Household to the Household microservice with the Household Private Key, and retrieves all the Encrypted Member Private Key Recovery Secret Keys (MPKRSKeys) that the Household microservice had backed up for this Household. The Household app can decrypt the Encrypted MPKRSKeys with the Household Private Key. The Household app hands over the MPKRSKeys to the Member app. For each Member, the Member app retrieves the Encrypted Member Private Key from the Member microservice in the central service. For each Member, the Member app decrypts the Encrypted Member Private Key with the corresponding MPKRSKey to retrieve the Member Private Key. For each Member, the Member app authenticates to the Member microservice with each Member Private Key, and requests all Encrypted Relationship Private Keys that the Member microservice has backed up for each Member. The Member app can decrypt all the Relationship Private Keys for each Member with each corresponding Member Private Key.

Figure 10:
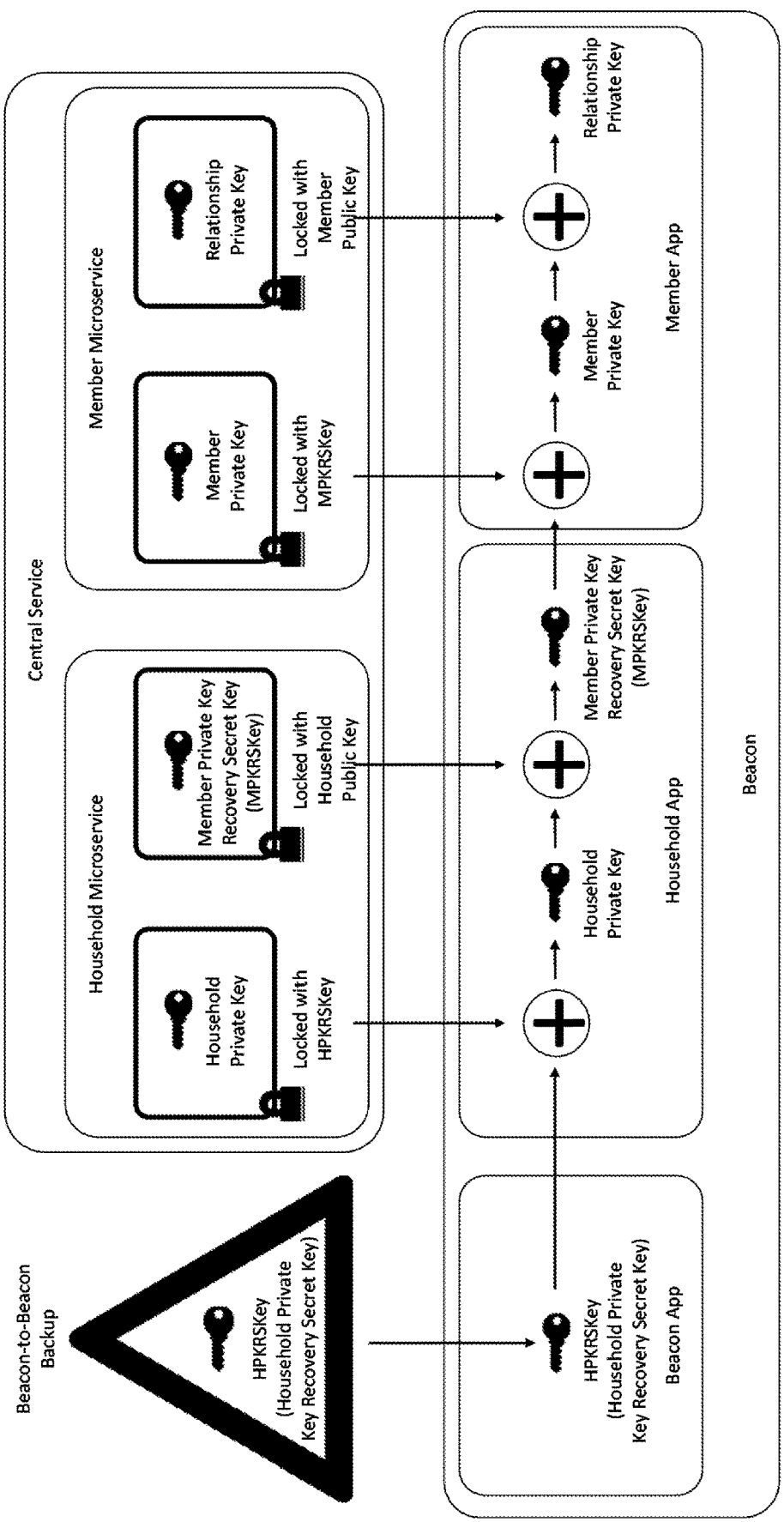
FIG. 10 illustrates a backup of cryptographic material in accordance with one embodiment.

FIG. 10 illustrates a backup of cryptographic material in accordance with one embodiment. Additional levels can be added to this hierarchy, for instance to handle Relationships that a Persona/Alias of the Member owns, and/or for a Secret Keys that would themselves protect data encrypted and shared within each Relationship.

IX. Beacon-to-Beacon Master Key Backup

Beacon-to-beacon backup can be used to back up the "Household Private Key Recovery Secret Key" (HPKRSKey) in a way that prevents all participants, including the central service, from getting access to it in a usable form. The backup process can be initiated by the "Owner beacon" which originally owns the Household Private Key, and can involve "Backup beacons" which can provide the backup service to the Owner beacon.

Beacon-to-beacon backup can be implemented as follows in accordance with one embodiment. The Owner beacon generates a Backup Secret Key, encrypts the HPKRSKey with it, and keeps the Encrypted HPKRSKey to itself for now. The central service generates a Central Backup Private/Public Key Pair, passes the Central Backup Public Key to the Owner beacon and keeps the Central Backup Private Key securely to itself. The Owner beacon encrypts the Backup Secret Key with the Central Backup Public Key so that it will only be able to be decrypted by the Central Backup Private Key, which is kept securely by the central service. The Owner beacon gives the Encrypted Backup Secret Key to the central service. Doing so makes the involvement of the central service necessary, but not sufficient, to recover the HPKRSKey. All beacons register with the central service as Backup beacons for others, and the central service enables the Owner beacon and its Members to select N Backup beacons randomly or based on other selection criteria (such as beacons belonging to family members, friends, colleagues or other trusted groups). The Owner beacon securely connects to each of the N Backup beacons and request a unique beacon Backup Public Key from each. Each Backup beacon generates a unique beacon Backup Private/Public Key Pair, passes the beacon Backup Public Key to the Owner beacon and keeps its beacon Backup Private Key securely to itself, protected in its secure hardware. The Owner beacon uses a "N=K+M erasure code" (such as Reed-Solomon) to encode the Encrypted HPKRSKey into N fragments comprising K original fragments and M redundancy fragments. Such erasure encoding ensures that the Encrypted HPKRSKey can be reconstructed from any K of the N encoded fragments. By scattering encoded fragments, it also ensures that the Encrypted HPKRSKey cannot be reconstructed by any entity that does not have the cooperation of at least K Backup beacon, or by any entity that somehow gained control over at least K fragments of the Encrypted HPKRSKey. The Owner beacon encrypts each Encrypted HPKRSKey fragment with each unique beacon Backup Public Key, and passes each double-encrypted fragment (first encryption was with the Backup Secret Key in step 1) to its corresponding Backup beacon. The Owner beacon passes the list of N Backup beacons to the central service for backup. Other variations and sequences of steps can be used.

X. Beacon-To-Beacon Master Key Recovery

A beacon-to-beacon Recovery service can be used to restore a "Household Private Key Recovery Secret Key" (HPKRSKey) in a Recovery beacon distinct from the primary beacon that originally owns it (Original Owner beacon), in a way that prevents all participants, including the central service, from getting access to it in a usable form. This can be used to deal with temporary beacon unavailability (home power loss or disconnection, restore temporarily in a randomly selected beacon) or complete hardware failure (restore in replacement beacon who becomes new Owner). In one embodiment, the recovery process is initiated by the central service, only after having confirmed that the Original Owner beacon is no longer available on the network. In other words, the always-connected nature of each beacon acts as a first lock on any attempt to recover the HPKRSKey.

Beacon-to-beacon master key recovery can be implemented as follows in accordance with one embodiment. The central service retrieves the Encrypted Backup Secret Key and the list of N Backup beacons that it had saved on behalf of the Original Owner beacon. The central service decrypts the Encrypted Backup Secret Key with its corresponding Central Backup Private Key which was protected by a Hardware Security Module and stored separately. The central service passes the Backup Secret Key and the list of N Backup beacons to the designated Recovery beacon. The Recovery beacon securely connects to at least K of the N Backup beacons and request the corresponding fragment of the Encrypted HPKRSKey. Before responding to the Recovery beacon's request, each of the K Backup beacons attempts to contact the Original Owner beacon to verify that it is no longer present. This verification can be done using a communication channel that completely bypasses the central service, such as a peer-to-peer channel or an independent third-party data messaging platform. If the Original Owner beacon is still present on the network and receives such a verification request from any of the Backup beacons, the Original Owner beacon attempts to connect to all N Backup beacons to block the HPKRSKey recovery process, alerts its members through every paired device, and contacts the central service that a breach is being attempted on that HPKRSKey. If the Original Owner beacon is not responding to the presence verification request within a reasonable window of time, each of the K Backup beacons will proceed with the recovery process.

Next, each of the K Backup beacons challenges the Recovery beacon with a Remote Attestation request to assure that key fragments are not passed to rogue recovery beacon as follows. Each of the K Backup beacon sends a random challenge string to the Recovery beacon. Using its Remote Attestation Device Key Pair, the Recovery beacon produces a Certificate Chains that include the random challenge string sent by each Backup beacon, and returns the Certificate Chain to each Backup beacon. Each Backup beacon verifies the Certificate Chain, by verifying: that the responding device is a certified beacon; that the beacon started in Verified Boot state; that the beacon runs the latest approved software; that the Certificate Chain includes the challenge string that it sent; and that the Certificate Chain is signed by the expected Certificate Authority.

Alternatively, the central service can carry out the Remote Attestation challenge process with the Recovery beacon, and send the random value used for the challenge to the N Backup beacons so that they can verify that the Certificate Chain presented by the Recovery beacon does include that specific random value. Each of the K Backup beacon can use its own beacon Backup Private Key to decrypt the fragment that it kept, and pass it securely (i.e. encrypted with the Public Device Key of the Recovery beacon) to the Recovery beacon. The Recovery beacon decodes the K fragments per the "N=K+M erasure code" that was originally used, and reconstructs the Encrypted HPKRSKey from them. The Recovery beacon then uses the Backup Secret Key (that it received from the central service in step 1) to decrypt the HPKRSKey. Other variations and sequences of steps can be used.

XI. Key Factory and Blind Key Backup

While all cryptographic keys should be generated and protected by secure hardware on the beacons, in one embodiment all such keys are first "blind backed up" centrally before they are used to encrypt anything. This backup supports recovery from unpredictable beacon hardware failure or destruction. The central service can be configured to do this while remaining completely blind to the actual cryptographic material. In one embodiment where no beacon app should ever use keys that have not been "blind backed up", this function can be centralized in a dedicated Key Factory app on each beacon.

Key factory and blind key backup can be implemented as follows in accordance with one embodiment. Each beacon runs a "Key Factory", a dedicated key generation and "blind backup" app. The Key Factory pre-generates Public/Private Key Pairs and Secret Keys for later use by other apps on the beacon. For each Public/Private Key Pair and Secret Key it generates, the Key Factory creates a Key Descriptor which contains the key itself and whatever metadata is needed to use it (type of key, algorithm used, time of creation . . . ). The Key Factory hashes the Key Descriptor and encrypts it with the hash (technique known as "Convergent Encryption") to produce the Encrypted Key Descriptor. (Because the Key Descriptor includes truly random strings, i.e. the keys themselves, there is no need for salting). The hash which was used to encrypt the Key Descriptor also becomes the Key Descriptor ID. The Key Factory hashes the Key Descriptor ID to produce a Key Descriptor Locator. The Key Factory passes the Encrypted Key Descriptor and the Key Descriptor Locator to the central service for "blind" backup. The central service has no visibility into the descriptor it just received, cannot retrieve the Key Descriptor ID from the Key Descriptor Locator (hashing is a one-way function) and does not store any other information. In other words, all the necessary metadata describing each Key is unknowable outside the beacon itself as only it has the Key Descriptor ID. Once the central service confirms to the Key Factory that the Encrypted Key Descriptor has been properly backed up along with the Key Descriptor Locator, the Key Factory can add the Key Descriptor ID to its lists of ready-to-use keys, and can make it available to another app on the beacon as needed. When another app on the beacon needs a new key or key pair, it requests it from the Key Factory. The Key Factory returns a new Key Descriptor ID and the app can use it as intended without delay. The requesting app stores and privately backs up the Key Descriptor ID for its own future uses. Once properly backed up by the app, the app informs the Key Factory app to delete the Key Descriptor ID from its own lists. The Key Factory caches recently used Encrypted Key Descriptors with their Key Descriptor Locators as a service to the other apps on the beacon. To request an existing key or key pair from the Key Factory, an app calculates the Key Descriptor Locator by hashing its Key Descriptor ID and by passing the Key Descriptor Locator to the Key Factory. If the requested Key Descriptor Locator is not in the cache, the Key Factory requests the corresponding Encrypted Key Descriptor from the central service by passing the Key Descriptor Locator. The Key Factory passes the Encrypted Key Descriptor to the requesting app. The app can decrypt the Encrypted Key Descriptor with the Key Descriptor ID, and verifies its integrity by hashing it and comparing the calculated hash with the Key Descriptor ID itself. Other variations and sequences of steps can be used.

XII. Generalized "Blind Backup" Offered by the Central Service

Beacons can run multiple apps to manage various types of private data with the strongest app isolation and the smallest attack surface possible. Because any beacon may fail at any instant, every app on every beacon can include a mechanism to back up private data in an always-on and reliable storage system without actually revealing any of the private data. Such private data can be actual private data about/from its Members, but can also be internal lists of object IDs (such as Key/Household/Member/Relationship/Data Descriptors) or metadata that are recursively generated and backed up by the applications on each beacons. The central service can operate and offers a generalized "Blind Backup" service for all apps of all beacons to use.

The blind backup service can be implemented generally as follows in accordance with one embodiment. An app has sensitive/private Data to "blind back up". The app hashes the Data to create a Data Identifier. The app encrypts the data with the Data Identifier (a technique known as "Convergent Encryption") to create the Encrypted Data. The app hashes the Data Identifier to create the Encrypted Data Locator. The app uploads the Encrypted Data to the central service with the Encrypted Data Locator as its pointer.

This blind backup service can be implemented by a Member app on behalf of a Member as follows. The Member app encrypts the Data Identifier with the Member Secret Key to create an Encrypted Data Identifier, and registers the new Encrypted Data Identifier with the Member Microservice in the central service. The Member Microservice in the central service adds the new Encrypted Data Identifier to the list of Encrypted Data Identifiers that it holds for that Member. The Member Secret Key itself was previously encrypted with the Member Public Key, and the Encrypted Member Secret Key was itself backed up in the Member Microservice in the central service on behalf of that Member.

This blind backup service can be implemented by a Household app on behalf of a Household as follows. The Household app encrypts the Data Identifier with the Household Secret Key to create an Encrypted Data Identifier, and registers the new Encrypted Data Identifier with the Household Microservice in the central service. The Household Microservice in the central service adds the new Encrypted Data Identifier to the list of Encrypted Data Identifiers that it holds for that Household. The Household Secret Key itself was previously encrypted with the Member Public Key, and the Encrypted Member Secret Key was itself backed up in the Household Microservice in the central service on behalf of that Household.

XIII. Generalized "Blind Backup" for Third-Party Apps or Encrypted Sharing

A "Blind Backup" service can also be made available to third-party organizations and their Relying Party apps as a standalone encryption service and/or an end-to-end encrypted data sharing service as follows. A Relying Party app has sensitive/private Data to "blind back up", and/or wants to share it with another entity on the network. The app hashes the Data to create a Data Identifier. The app encrypts the data with the Data Identifier (a technique known as "Convergent Encryption") to create the Encrypted Data. The app hashes the Data Identifier to create the Encrypted Data Locator. The app uploads the Encrypted Data to the central service with the Encrypted Data Locator as its pointer.

This blind backup service can be implemented by a Relying Party app on behalf of a Member as follows. The Relying Party app securely hands the Data Identifier over to the Member's Member app in the Member's beacon. The Member app encrypts the Data Identifier with the Member Secret Key to create an Encrypted Data Identifier, and registers the new Encrypted Data Identifier with the Member Microservice in the central service. The Member Microservice in the central service adds the new Encrypted Data Identifier to the list of Encrypted Data Identifiers that it holds for that Member. The Member Secret Key itself was previously encrypted with the Member Public Key, and the Encrypted Member Secret Key was itself backed up in the Member Microservice in the central service on behalf of that Member.

This blind backup service can be implemented in the case the Data is to be shared with other Members as follows. The Relying Party app or the beacon Member app connects with other Members' beacon Member apps with whom the Data needs to be shared, and securely sends the Data Identifier. With the Data Identifier, the other beacon Member apps can calculate the Encrypted Data Locator and can request the Encrypted Data from the central service. With the Data Identifier, the other beacon Member apps can decrypt the Encrypted Data to retrieve the Data and make it available to the Member it was to be shared with.

XIV. User Activates Beacon by Connecting it to the Internet Through their Home Wi-Fi As part of the factory software initialization, each beacon can create a unique, completely random Device Private/Public Key Pair in their secure hardware enclave. By design, in one embodiment, the Device Private Key cannot be extracted from the silicon in which it has been created. Each beacon can have transmitted and registered its Device Public Key and full certificate chain to the central service. The central service can have encoded the Device Public Key Locator (the hash of the Device Public Key) in a QR code that would be printed on a label and attached on the bottom of the unit. Alternatively, the Device Public Key Locator can be displayed by the beacon itself on a built-in display. The beacon can display its Device Public Key Locator when it is in a mode that requires the user to transmit the Device Public Key Locator electronically to the central service.

Beacon Wi-Fi setup can be implemented as follows in accordance with one embodiment. Out-of-the-box, a blank beacon cannot connect to any Wi-Fi network and automatically enters "activation mode". The user downloads the phone app. Upon first launch, the phone app creates a unique App ID and associated App Private/Public Key pair for its own cryptographic authentication and secure connection purposes with the App Microservice in the central service. The phone app securely connects to the App Microservice in the central service and registers itself. The user selects "Activate your new beacon" and is prompted to scan the QR code printed on the sticker on the bottom of the beacon. Alternatively, the QR code may be presented to the user on a built-in display in the beacon. The app decodes the QR code and passes it to the central service. The QR code contains the encoded Device Public Key Locator as set up at manufacturing time. The central service retrieves the Device Public Key and securely passes it to the app. The user is prompted to enter their Wi-Fi SSID and Wi-Fi password, the app encrypts the information with the Device Public Key and creates a QR code. The user presents the QR code to the beacon camera. In "activation mode", the beacon is waiting for such a QR code. Once detected, it scans it and decrypts it with the Device Private Key to connect to the Wi-Fi network. Once successfully connected to the Wi-Fi network, the beacon connects to the central service to proceed with the activation by returning the hash of its Device Public Key and authenticating itself to the central service through a Device Public/Private Key challenge from the central service. The central service authenticates the device and provides feedback to the user on the beacon itself and by refreshing the screen in the phone app that the activation is proceeding successfully. The central service assists in establishing a secure communication channel between the phone app and the beacon for subsequent steps.

XV. User Claims Beacon and Registers "Household"

Beacon claiming and household registration can be implemented as follows in accordance with one embodiment. Upon successful activation and first connection to the central service from the residence of its user, the beacon enters "claiming mode". The beacon's Household app creates a unique Household ID and associated Household Private/Public Key pair. The beacon's Household app backs up the Household Private Key in accordance to the "Hierarchical and Recursive Key Encryption and Backup" and "beacon-to-beacon Master Key Backup" methods explained separately. The beacon's Household app generates a random Household Secret Key that will be used to encrypt future data that needs to be backed up in the cloud for that household. The beacon's Household app encrypts the Household Secret Key with its Household Public Key and backs up its Encrypted Household Secret Key in the Household Microservice in the central service. The phone app prompts the user to enter the home address of the household exactly as it should appear on any postal mailing to ensure proper delivery. Optionally, the phone app and/or the central service may attempt to normalize the address by leveraging APIs from the postal service. This may prompt the user to agree and/or correct the address according of the official address recognized by the postal service. When ready to proceed, the phone app and the beacon exchange a unique code through their secure communication channel. The phone app creates a QR code with this unique code and displays it on the phone screen. The user presents the QR code to the beacon's camera to validate physical access to the beacon. Once the beacon recognize the code, the process can proceed. The phone app passes the household address to the Household app on the beacon through their secure communication channel. The beacon Household app "blind backs up" the household address with the central service. The Household app passes the household address to the beacon app, which then registers the beacon ID along with the household address in the central service. The central service then provides feedback to the user, optionally both on the beacon itself and by refreshing the app with a completion message, that the claiming process was successfully completed. The phone app passes its own unique identifier and App Public Key to the beacon, which it stores for future seamless authentications. The phone app registers with the Household/beacon Notification service on the beacon so that the beacon can notify the phone app of any future noteworthy activity and/or other events relevant to the user. The central service triggers the sending of another unique and temporary QR code to that household address in a physical letter, in a sealed envelope. The household and its beacon will only be marked as "Verified" once the user receives the letter and presents the QR code to their beacon. Some services can require "Verified" status, such as recovery of all household data in case of a beacon hardware failure. In such a situation, a recovery QR code will only be sent in a sealed envelope to the household address on file. Beacons can be configured to operate in Verified and un-Verified modes.

XVI. User Creates "Head of Household" Master Account

Creation of a head of household master account can be implemented as follows in accordance with one embodiment. Once successfully claimed and registered with a household address, the beacon enters "master account creation" mode. The beacon's Member app creates a unique Member ID and associated Household Private/Public Key pair. The beacon's Member app backs up the Member Private Key in accordance to the "Hierarchical and Recursive Key Encryption and Backup" method explained separately. The beacon's Member app generates a random Household Secret Key that will be used to encrypt future data that needs to be backed up in the cloud for that Member. The beacon's Member app encrypts the Member Secret Key with its Member Public Key and backs up its Encrypted Member Secret Key in the Member Microservice in the central service. The phone app prompts the user to enter the first and last name of the head of household. The phone app prompts the head of household to create a passphrase (long password) and a PIN (shorter code to be used on paired trusted devices). The phone app processes the passphrase and PIN per best industry practices. When ready to proceed, the phone app and the beacon exchange a unique code through their secure communication channel. The phone app creates a QR code with this unique code and displays it on the phone screen. The user presents the QR code to the beacon's camera to validate physical access to the beacon. Once the beacon recognize the code, the process can proceed. The phone app passes the head of household information to the beacon's Member app through their secure communication channel. The beacon's Member app hashes/encrypts and stores the hashed/encrypted passphrase and PIN per best industry practices for account credentials storage. The beacon's Member app packs all the head of household info into a Member Descriptor and "blind backs it up" in the central service. Once the previous steps are completed and confirmed, the central service provides feedback to the user, optionally both on the beacon itself and by refreshing the app with a completion message, that the claiming process and master account creation were successfully completed. The phone app passes its own unique identifier and App Public Key to the beacon's Member app, which it stores for future seamless authentications. The phone app registers with the Member Notification service on the beacon so that the beacon can notify the phone app of any future account activity and/or other events relevant to the user and/or the security of the account.

The passphrase and PIN can be optional. Resetting them can be achieved in a self-service fashion by requiring physical access to the beacon, for instance by having a QR code physically mailed to the residence and by requiring the user to present the printed QR code to the beacon's camera. Alternatively, the beacon can be equipped with a physical press-button switch that can set the beacon is a special mode for a limited time window within which protected operations can be performed. Alternatively, the beacon can have a built-in display that displays a human-readable numerical code or a machine-readable QR code that need to be entered in a configuration portal to enable specific protected operations.

XVII. Creating Additional Accounts

In one embodiment, additional accounts can only be created on beacons claimed by a household, and the process is initiated by the Head of Household as follows. The Head of Household selects "create new account" on their phone app, which alerts the beacon to enter "create new account" mode. The additional member downloads the phone app on their own phone. Upon first launch, the phone app creates a unique App ID and associated App Private/Public Key pair for its own cryptographic authentication and secure connection purposes with the App Microservice in the central service. The phone app securely connects to the App Microservice in the central service and registers itself. The phone app prompts the additional member to enter their first and last name, along with the home address of the household as registered by the head of household. The phone app prompts the additional member to create a passphrase and a PIN. The phone app processes the passphrase and PIN per best industry practices. When ready to proceed, the phone app and the central service exchange a unique verification code through their secure communication channel. The phone app creates a QR code with this unique verification code and displays it on the phone screen. The additional member presents the QR code to the head of household. The head of household scans it with their own phone app, which sends it to the beacon, which send it back to the central service. Once it matches the code, the central service, through the beacon, prompts the head of household to confirm the additional member. Once the head of household confirms, the beacon starts the additional account creation process in a manner similar to the head of household account creation process.

Other flows are possible around the exchange of the unique verification code between the additional member phone app, the central service, the beacon and the head of household phone app. Essentially, any one of those entities can produce the unique verification code, and the code can be propagated in any direction and by any secure means among those entities. One goal of the unique verification code is to verify that the entities that have access to it are all participating in the same operation.

XVIII. Pairing a Device

Pairing can be used to pair initial device or a second device, if a device was initialized as part of the account set up, to an existing member account on an already activated and claimed beacon. Pairing can be implemented as follows in accordance with one embodiment. User downloads the app on their phone or device. Upon first launch, the phone app creates a unique AppID and associated Private/Public Key pair for its own cryptographic authentication purposes with the beacon. User enters first and last name, home address and passphrase in the phone app. The phone app connects to the central service and request a connection to the beacon associated with that home address, and the central service establishes a connection with the beacon associated with that home address. The phone app passes the first and last name, along with the passphrase (hashed/encrypted per best practices for account credentials) to the beacon. The beacon verifies account and credentials, and if everything checks out, the beacon generates a unique code and passes it securely to the phone app. The phone app receives the unique code, creates a QR code and displays it. The user shows the QR code to the beacon camera. The beacon scans the QR code and verifies it. The scanning of the QR code may be required to happen within a specific time window, 60 seconds for instance. The phone app passes its own unique identifier and App Public Key to the beacon, which it stores for future seamless authentications. The phone app registers with the Member/Household/beacon Notification service so that the beacon can notify the phone app of any future account activity and/or other events relevant to the user and/or the security of the account. In one embodiment, a phone app, and hence the phone that it runs on, can only be paired with one Member account on one beacon.

XIX. Use of Paired Phone or Device to Transitively Pair Another Phone or Device

Transitive pairing of additional devices can be implemented as follows in accordance with one embodiment. A paired phone or device can be used to transitively pair another phone or device to a beacon. User downloads the phone app on the other phone or an equivalent app on the other device. Upon first launch, the phone app creates a unique AppID and associated Private/Public Key pair for its own cryptographic authentication purposes with the central service and beacon. User enters first and last name, home address and passphrase in the phone app. The phone app connects to the central service and request a connection to the beacon associated with that home address, and the central service redirects the connection request to the beacon associated with that home address. The phone app passes the first and last name, along with the passphrase (hashed/encrypted per best practices for account credentials) to the beacon. The beacon verifies account and credentials, and if everything checks out, the beacon generates a unique code and passes it securely to the phone app. The phone app receives the unique code, creates a QR code and displays it. The beacon also informs the Paired Phone of a pairing request for the same user on another phone. The user confirms or rejects the intent to pair the other phone, in which case the Paired Phone enters into pairing mode. The user shows the QR code on the other phone to the camera of the Paired Phone. The Paired Phone scans the QR code, sends it to the beacon, and the beacon verifies it. The scanning of the QR code may be required to happen within a specific time window, 60 seconds for instance. The phone app passes its own unique identifier and App Public Key to the beacon, which it stores for future seamless authentications. The phone app registers with the Member/Household/beacon Notification service so that the beacon can notify the phone app of any future account activity and/or other events relevant to the user and/or the security of the account.

XX. Trusted Peer-to-Peer Transactional System

In accordance with one embodiment, the system can support distributed cryptographic verification, execution and audits of transactions between accounts, while preserving the privacy of both the transactions and the accounts. The system can act as a central service for coordination and the availability of distributed Trusted Agents, such as beacons, for verification, execution and future audits.

The central service can receive private transaction execution requests from originating account owners and delegate the cryptographic verification and execution of these transactions to the Trusted Agents. Once their work is completed, the Trusted Agents can report back to the central service. The central service can then publish an immutable and publicly available blockchain of verified transaction pointers that does not include private information about the transactions themselves or account balances.

Some advantages of delegating to Trusted Agents are scalability and privacy. Scalability is automatically achieved with the addition of more Agents to the system. Privacy is obtained by selective and limited disclosure of private transaction and account information to the designated verifying Agent only. The central service can be configured to not have visibility into the private content of the transactions and/or balance of the accounts, and Trusted Agents can be configured to not store private information once a transaction has been verified and executed. In one embodiment, only the originating account owners keep the information necessary to maintain unencrypted access to the transaction records.

Account balances can be securely managed without making private transaction and balance information visible to the central service. Trusted Agents can be configured to be able to access previous account balances prior to executing the transaction. Trusted Agents can be configured to be able to report and certify new account balances once the transaction is executed. The private transaction and resulting account balances can be cryptographically tied in a way that can be publicly verified without granting access to their content.

The system can be used for "simple" transactions such as transfers of cryptocurrency between accounts, but can also be used to execute more sophisticated contracts between third-parties in a scalable and private fashion.

While the system can protect the privacy of transactions by default, it need not prevent the originating account owners from disclosing transactions to select third-parties if desired or required to comply to reporting or auditing requirements. Auditing can be achieved using the same system, whereby a designated Trusted Agent gets restricted access to the content of a transaction and corresponding account statements for the exclusive purpose of the audit. The Trusted Agent can then report back to the central service without necessarily disclosing the private information.

XXI. Terminology

Various terms used within the present specification are explained below by way of example. The explanations shall be understood to provide context for understanding of the disclosed embodiments and should not be understood to be limiting of the claimed invention.

Account: An Account can be represented by a public key. The owner of an account can be the entity that has control over the corresponding private key as demonstrated when signing Transactions to/from the Account.

Transaction (TX): A Transaction can be a document (such as a JSON descriptor) that outlines all information necessary for a Trusted Agent to verify and execute the Transaction, including the type of transaction, a nonce, the originating parties' Accounts, the Transfer Amount (if any) and identifiers to Encrypted Statements Before Transaction (see below) for the Accounts. The Transaction can be created and signed by the originating parties to verify mutual consent.

Figure 11A:
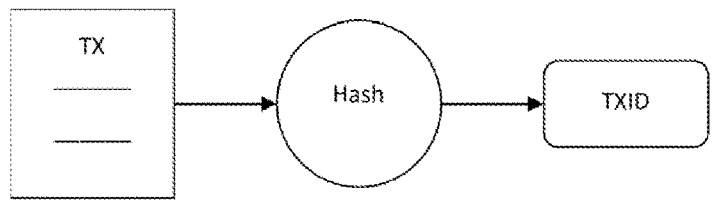
FIGS. 11A-F illustrate certain named transactions used in the disclosure.

Transaction Identifier (TXID): As shown in FIG. 11A, a Transaction Identifier can be a 256-bit identifier calculated by hashing the Transaction (TX). It can be represented as follows: TXID=Hash(TX).

Figure 11B:
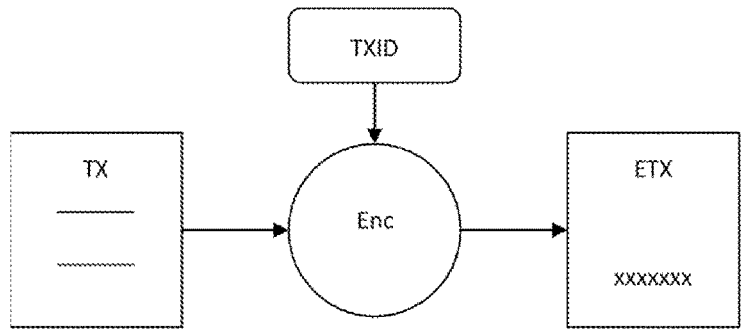

Encrypted Transaction (ETX): As shown in FIG. 11B, an Encrypted Transaction can be a Transaction document (TX) encrypted with its own 256-bit hash, i.e. the Transaction Identifier (TXID). This can be referred to as Convergent Encryption whereby a content hash is used as a symmetric key to encrypt the content itself. It can be represented as follows: $ETX=Enc_{TXID}(TX)$.

Statement Before Transaction (SBT): A Statement Before Transaction can be a document (such as a JSON descriptor) that states the balance of an Account as updated by a Trusted Agent after the previous Transaction. It can enable a Trusted Agent to verify whether a pending Transaction can be executed (i.e. whether there are enough funds, for instance). For each pending Transaction, the Statement Before Transaction can be the Statement After Transaction from the previous Transaction involving the same account.

Statement After Transaction (SAT): A Statement After Transaction can be a document (such as a JSON descriptor) that states the balance of an Account as updated by a Trusted Agent once it has executed the pending Transaction. For each executed Transaction, the Statement After Transaction can be the Statement Before Transaction for the next Transaction involving the same account.

Statement Before Transaction Identifier (SBTID): A Statement Before Transaction Identifier can be a 256-bit private identifier that identifies the Statement Before Transaction, and that can be calculated from the previous Transaction identifier. See below how the Statement After Transaction Identifier can be calculated for the pending transaction.

Figure 11C:
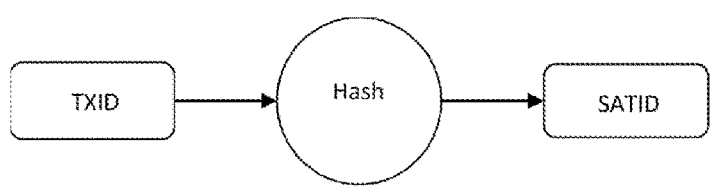

Statement After Transaction Identifier (SATID): As shown in FIG. 11C, a Statement After Transaction Identifier can be a 256-bit private identifier that identifies the Statement After Transaction once the Transaction is executed. The SATID can be calculated by hashing the Transaction Identifier (TXID). It can be represented as follows: SATID=Hash(TXID).

Encrypted Statement Before Transaction (ESBT): An Encrypted Statement Before Transaction can be the Statement Before Transaction (SBT) encrypted with the Statement Before Transaction Identifier (SBTID). ESBT and SBTID can be calculated during the processing of the previous Transaction. See below how the Encrypted Statement After Transaction can be calculated for the pending transaction.

Figure 11D:
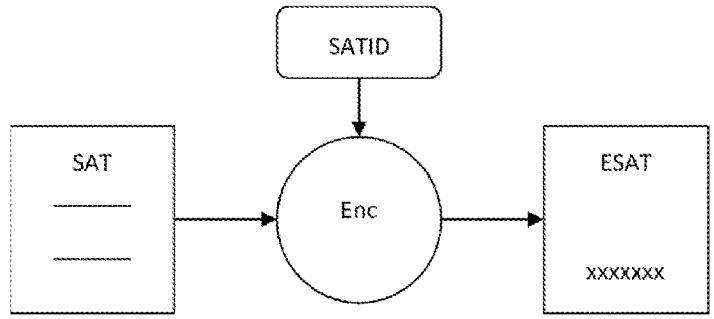

Encrypted Statement After Transaction (ESAT): As shown in FIG. 11D, an Encrypted Statement After Transaction can be the Statement After Transaction (SAT) encrypted with the Statement After Transaction Identifier (SATID) once the Transaction is executed and both SAT and SATID have been created and calculated. It can be represented as follows: $ESAT=Enc_{SATID}(SAT)$.

Encrypted Statement Before Transaction Locator (ESBT-LOC): An Encrypted Statement Before Transaction Locator can be a 256-bit locator that points to the Encrypted Statement Before Transaction as stored by the central service. The ESBTLOC can be calculated during the processing of the previous Transaction. See below how the Encrypted Statement After Transaction Locator can be calculated for the pending transaction.

Figure 11E:
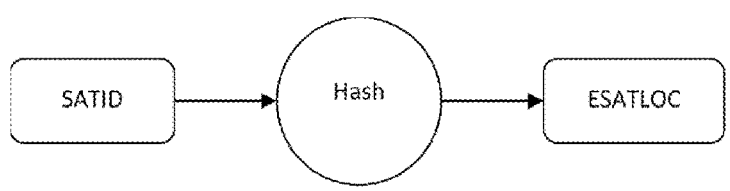

Encrypted Statement After Transaction Locator (ESBT-LOC): As shown in FIG. 11E, an Encrypted Statement After Transaction Locator can be a 256-bit locator that points to the Encrypted Statement After Transaction as stored by the central service. The ESATLOC can be calculated by hashing the Encrypted Transaction Locator (ETXLOC). It can be represented as follows: ESATLOC=Hash(SATID)

Figure 11F:
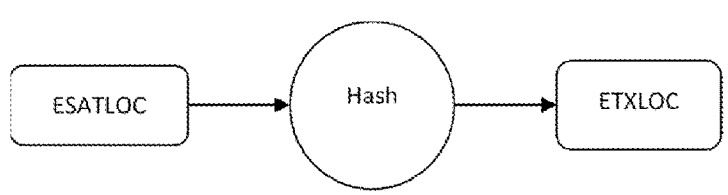

Encrypted Transaction Locator (ETXLOC): As shown in FIG. 11F, an Encrypted Transaction Locator can be a 256-bit locator that points to the Encrypted Transaction as stored by the central service. The ETXLOC can be calculated by hashing the Statement After Transaction Identifier (SATID). It can be represented as follows: ETXLOC=Hash(ESAT-LOC).

Previous Transaction Identifier (PTXID): A Previous Transaction Identifier can be the Transaction Identifier (TXID) of a previous transaction that resulted in a current Statement Before Transaction.

XXII. Private Verification and Execution

In accordance with certain embodiments, the system can leverage the one-way nature of cryptographic hash functions to create a "one-way hash sequence". Any entity that has access to a given hash in the sequence can automatically calculate all downstream hashes in the sequence, but is unable to calculate any of the upstream ones. By carefully crafting the role of each hash in the sequence (as an identifier, pointer and/or encryption key for instance), one can selectively give access to partial data while maintaining a cryptographic link between all data elements. The same approach is applicable for any sequence length so that additional hashing steps could be added for more sophisticated selective disclosure schemes. This can be accomplished as described in the remainder of this section below.

Figure 12A:
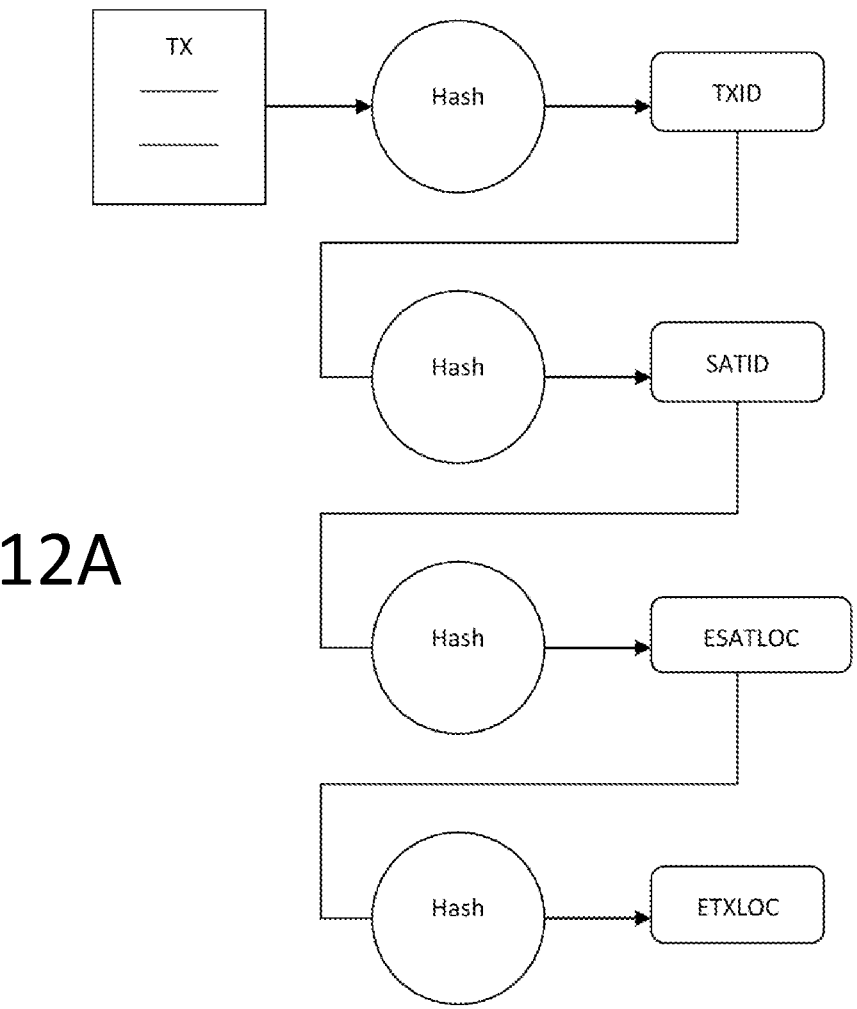
FIGS. 12A-O illustrate transactions in a process of private verification and execution.

An originating account owner (the "Owner") can prepare the pending transaction TX. As shown in FIG. 12A, it can then create the illustrated hash sequence, with each generated 256-bit value playing distinct roles in the algorithm.

Figure 12B:
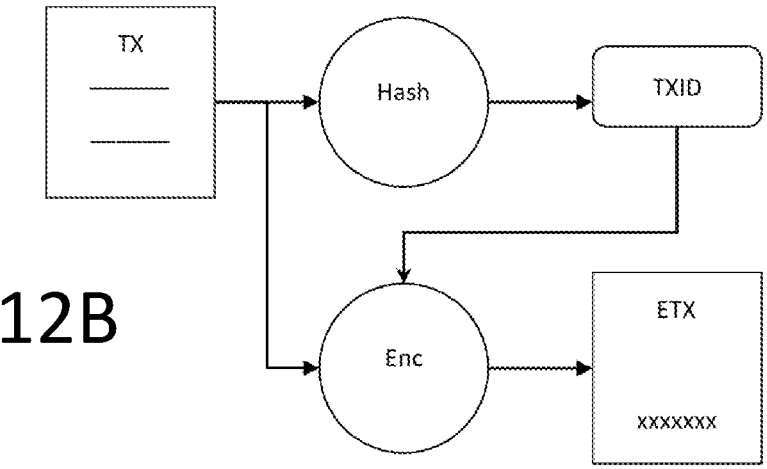

As illustrated in FIG. 12B, to privately upload the Transaction (TX) with the central service, the Owner can encrypt TX with TXID to create the Encrypted Transaction (ETX).

Figure 12C:
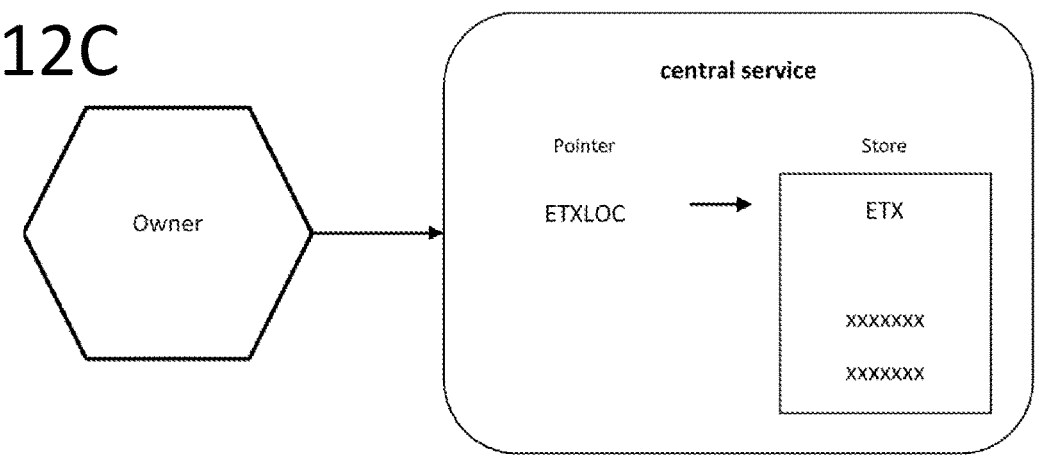

As illustrated in FIG. 12C, the Owner can then register its Transaction request by uploading the Encrypted Transaction (ETX) along with the pre-calculated Encrypted Transaction Locator (ETXLOC) to the central service. This starts the verification and execution process.

Figure 12D:
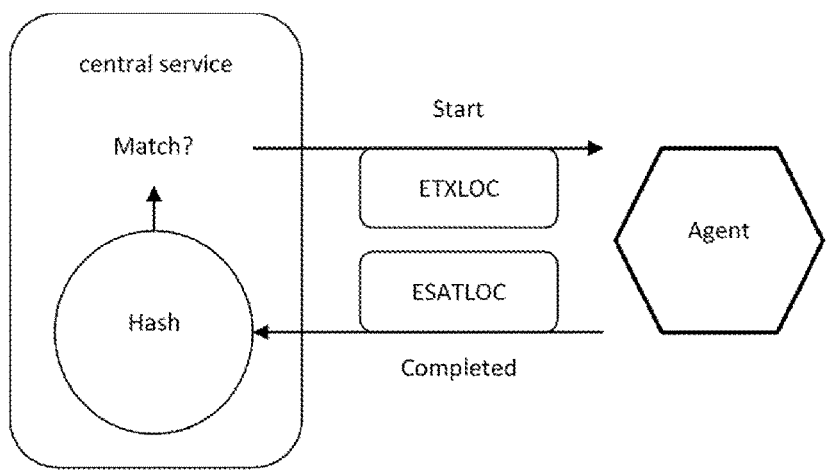

As illustrated in FIG. 12D, the central service can designate a Trusted Agent (the Agent) to process the Transaction. The central service can pass the Owner ID, the ETXLOC and a Random Nonce to the Agent, and instruct it to contact the Owner. The central service expects the Agent to confirm execution by returning the ESATLOC value.

Figure 12E:
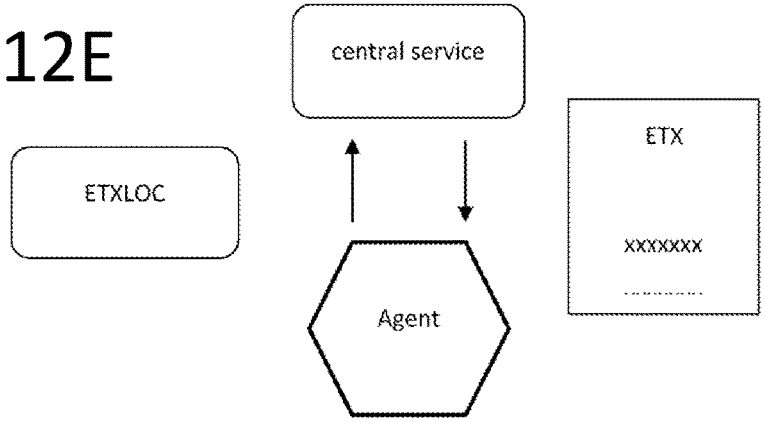
Figure 12F:
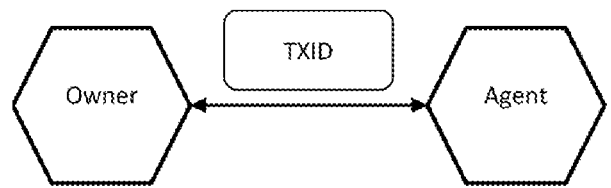
Figure 12G:
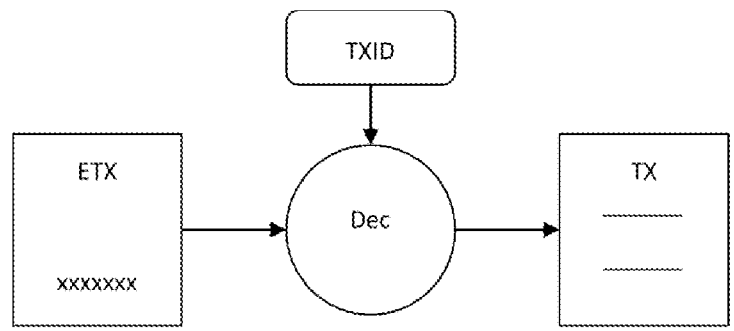
Figure 12H:
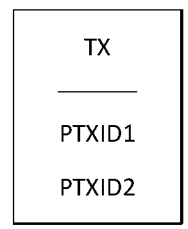

As illustrated in FIG. 12E, with the ETXLOC, the Agent can retrieve ETX from the central service. As illustrated in FIG. 12E, the Agent can contact the Owner to get the Transaction ID (TXID). As illustrated in FIG. 12G, with the TXID, the Agent can decrypt ETX and retrieve the TX. As illustrated in FIG. 12H, transactions that involve adjusting account balances include the Previous Transaction Identifiers (PTXIDs) of the transactions that generated the current Statements Before Transaction (SBTIDs).

Figure 12I:
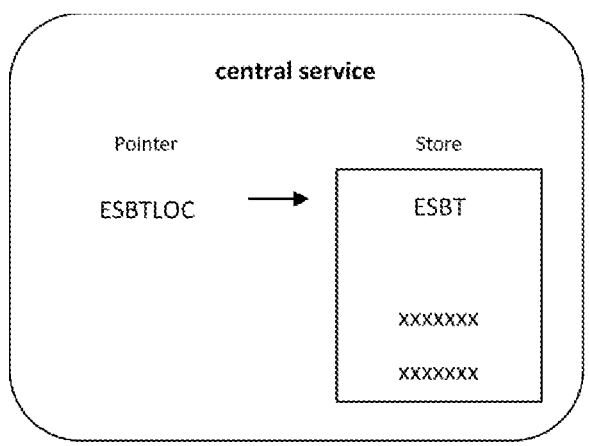
Figure 12J:
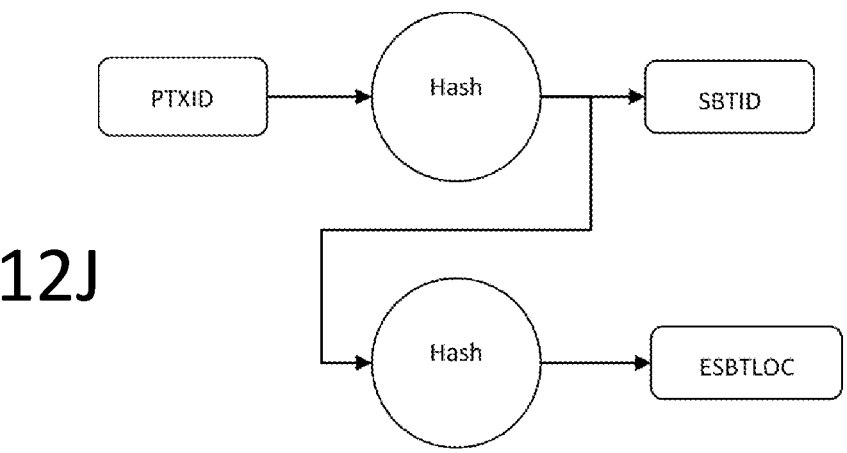
Figure 12K:
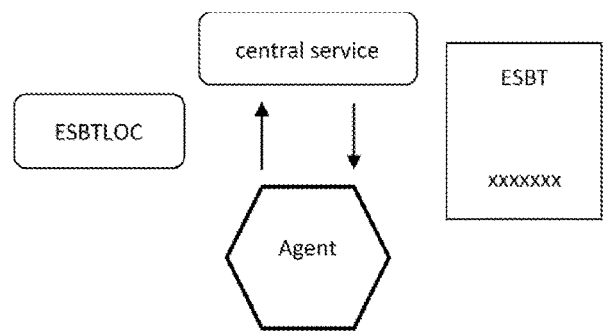
Figure 12L:
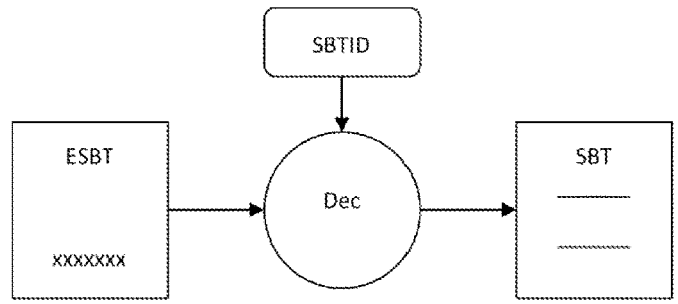

As illustrated in FIG. 12I, the central service can maintain Encrypted Statements in the same way that it can maintain Encrypted Transactions. The Agent that processed the previous transaction uploaded what is now the Encrypted Statement Before Transaction (ESBT) to the central service using the ESBTLOC pointer that had been calculated at the time. As illustrated in FIG. 12J, for each PTXID listed in the current Transaction, the Agent can re-calculate the corresponding Statement Before Transaction Identifier (SBTID) and the Encrypted Statement Before Transaction Locator ESBTLOC. As illustrated in FIG. 12K, with the ESBTLOC, the Agent can retrieves the ESBT from the central service. As illustrated in FIG. 12L, with the SBTID, the Agent can decrypt the ESBT and can retrieves the SBT.

Figure 12M:
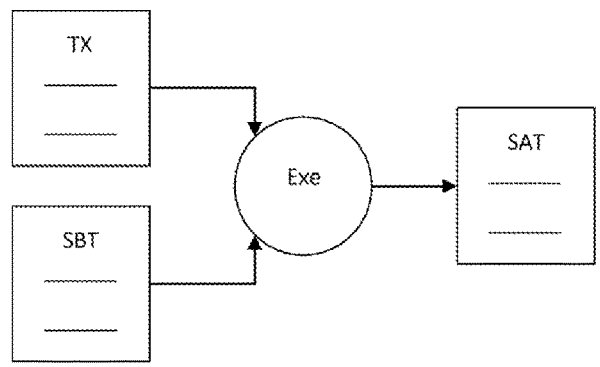
Figure 12N:
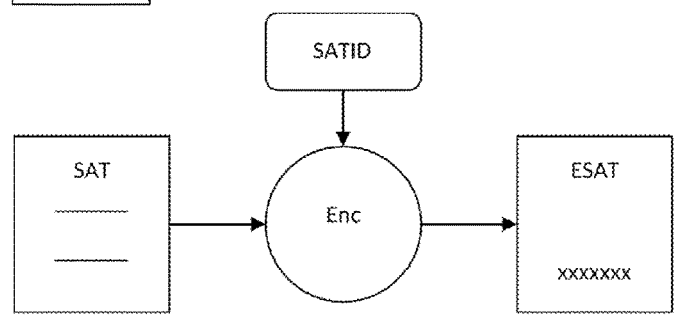

As illustrated in FIG. 12M, at this point, the Agent has retrieved the Transaction TX and all the Statements Before Transactions. The Agent can verify the Transaction and the account balances, execute the Transaction, and create the new Statements After Transaction for each account as needed. As illustrated in FIG. 12N, before uploading each Statement After Transaction to the central service, the Agent can encrypt it with the Statement After Transaction Identifier (SATID) that was calculated as part of the hash sequence to create the Encrypted Statement After Transaction (ESAT).

Figure 12O:
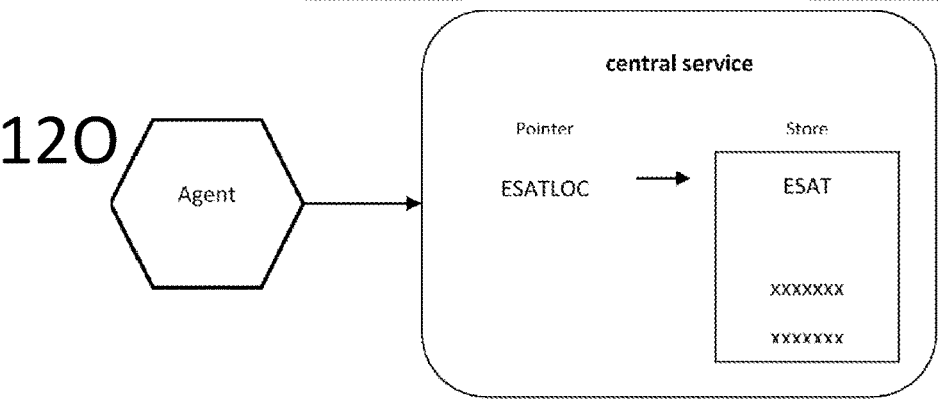

As illustrated in FIG. 12O, the Agent can pass the Encrypted Statement After Transaction (ESAT) to the central service using the Encrypted Statement After Transaction Locator (ESATLOC) pointer that was calculated as part of the hash sequence. At this point, the Transaction TX has been executed and the resulting Statements After Transactions in an encrypted form (ESAT) are ready for the next transaction to take place with each corresponding account. The Agent can confirm that fact by returning the ETXLOC to the central service. In one embodiment, the central service can be configured to have been expecting this confirmation from the moment it received that ETXLOC from the Owner. In the absence of a confirmation within a certain time window, the central service can designate another Trusted Agent to retry.

XXIII. Creation and Publication of the Blockchain

Figure 13:
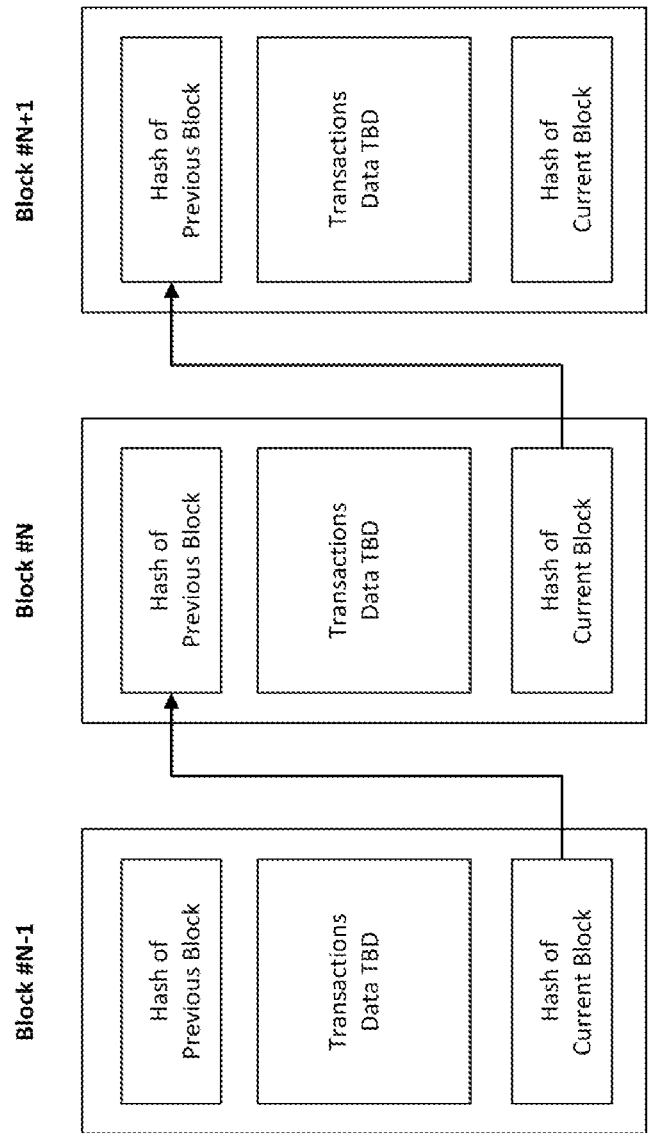
FIG. 13 illustrates a creation and publication of a blockchain in accordance with one embodiment.

As illustrated in FIG. 13, the central service can be configured to collect ETXLOCs from its Trusted Agents and groups them to create blocks. Additional information may be added to each block. Read-only copies of the entire blockchain will be synched to multiple locations to prevent tampering.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 14:
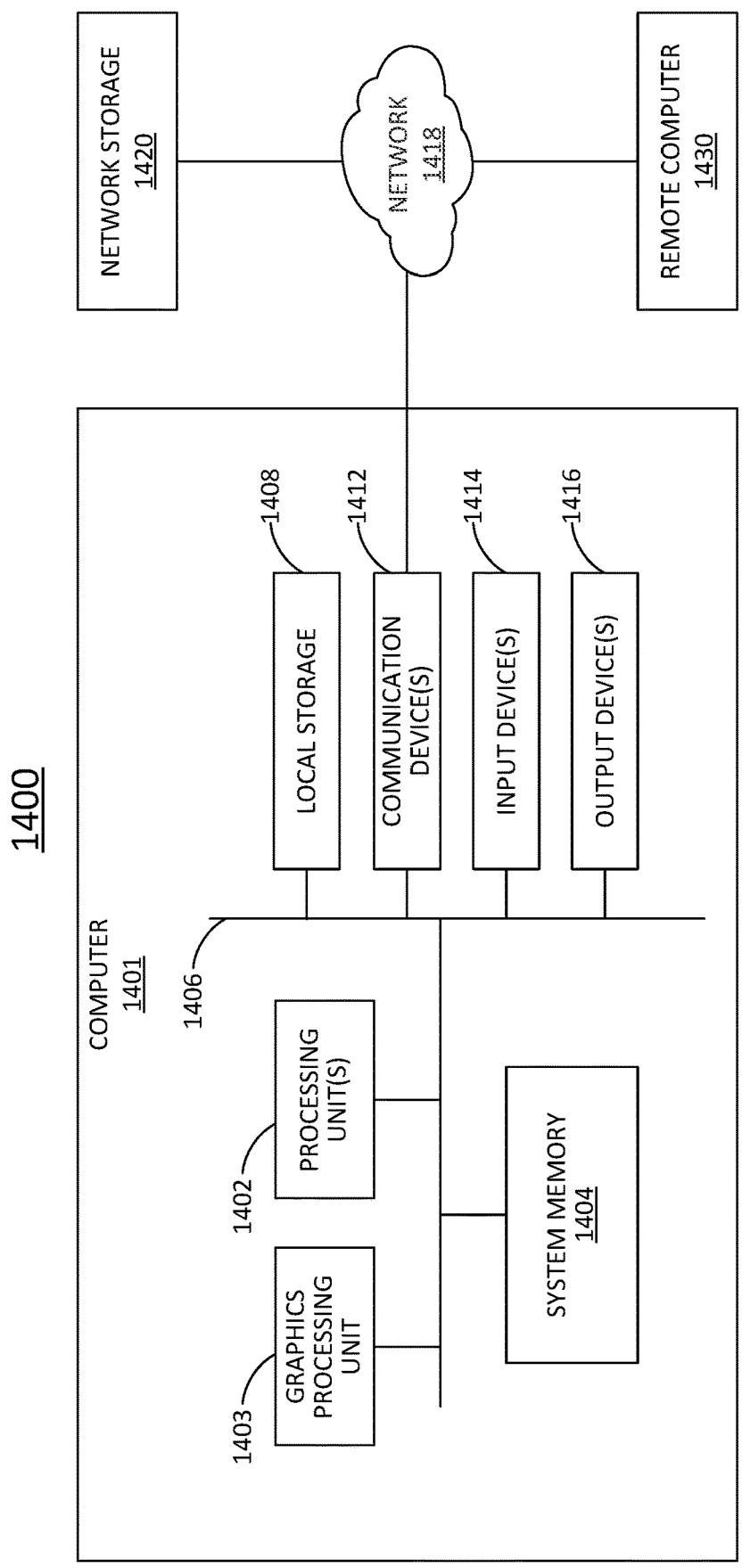
FIG. 14 illustrates a general computer architecture that can be appropriately configured to implement components disclosed in accordance with various embodiments.

FIG. 14 illustrates a general computer architecture 1400 that can be appropriately configured to implement components disclosed in accordance with various embodiments. The computing architecture 1400 can include various common computing elements, such as a computer 1401, a network 1418, and one or more remote computers 1430. The embodiments disclosed herein, however, are not limited to implementation by the general computing architecture 1400.

Referring to FIG. 14, the computer 1401 can be any of a variety of general purpose computers such as, for example, a server, a desktop computer, a laptop computer, a tablet computer or a mobile computing device. The computer 1401 can include a processing unit 1402, a system memory 1404 and a system bus 1406.

The processing unit 1402 can be any of various commercially available computer processors that can include one or more processing cores, which can operate independently of each other. Additional co-processing units, such as a graphics processing unit 1403, also can be present in the computer.

The system memory 1404 can include volatile devices, such as dynamic random access memory (DRAM) or other random access memory devices. The system memory 1404 can also or alternatively include non-volatile devices, such as a read-only memory or flash memory.

The computer 1401 can include local non-volatile secondary storage 1408 such as a disk drive, solid state disk, or removable memory card. The local storage 1408 can include one or more removable and/or non-removable storage units. The local storage 1408 can be used to store an operating system that initiates and manages various applications that execute on the computer. The local storage 1408 can also be used to store special purpose software configured to implement the components of the embodiments disclosed herein and that can be executed as one or more applications under the operating system.

The computer 1401 can also include communication device(s) 1412 through which the computer communicates with other devices, such as one or more remote computers 1430, over wired and/or wireless computer networks 1418. Communications device(s) 1412 can include, for example, a network interface for communicating data over a wired computer network. The communication device(s) 1412 can include, for example, one or more radio transmitters for communications over Wi-Fi, Bluetooth, and/or mobile telephone networks.

The computer 1401 can also access network storage 1420 through the computer network 1418. The network storage can include, for example, a network attached storage device located on a local network, or cloud-based storage hosted at one or more remote data centers. The operating system and/or special purpose software can alternatively be stored in the network storage 1420.

The computer 1401 can have various input device(s) 1414 such as a keyboard, mouse, touchscreen, camera, microphone, accelerometer, thermometer, magnetometer, or any other sensor. Output device(s) 1416 such as a display, speakers, printer, or eccentric rotating mass vibration motor can also be included.

The various storage 1408, communication device(s) 1412, output devices 1416 and input devices 1414 can be integrated within a housing of the computer, or can be connected through various input/output interface devices on the computer, in which case the reference numbers 1408, 1412, 1414 and 1416 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Aspects of Various Embodiments

In one aspect, a method includes operating an online service configured to receive requests for access by a plurality of users to a plurality of third-party services; and for each user of the plurality of users: deploying a network-connected always-on cryptographic server in a residence of the user, wherein the cryptographic server has a cryptographic relationship established with the online service prior to the deploying; sending a code by postal mail to the user at the residence; in response to the user presenting the mailed code to the cryptographic server, receiving a transmission by the cryptographic server at the online service; the online service validating the residence of the user in association with the cryptographic server based on the received transmission and based on the pre-existing cryptographic relationship; in response to the online service receiving a request for access by the user to a third-party service, the cryptographic server receiving credentials from the user; and in response to receiving the credentials, the cryptographic server authenticating the user.

In one aspect, the deployed cryptographic server is configured to communicate exclusively with the online service.

In one aspect, the cryptographic server includes a trusted and secure cryptographic chip inserted at manufacture time.

In one aspect, the cryptographic relationship is based on an exchange of public keys between the cryptographic server and the central service.

In one aspect, the method further includes, for the each user: establishing a trusted connection between the deployed cryptographic server and the online service based on the pre-existing cryptographic relationship, wherein the receiving a transmission by the cryptographic server at the online service uses the trusted connection.

In one aspect, the transmission by the cryptographic server includes the code.

In one aspect, the cryptographic server is equipped with a local camera, the code is mailed in a form of a printed QR code, and the user scans the QR code with the camera.

In one aspect, the method further includes, for the each user: in response to a request by the third-party service to initiate a verification of the user's address of residence, the online service transmitting a verification code to the third-party service, wherein the third-party service causes the verification code to be sent to the user at the residence by postal mail; and in response to the user presenting the mailed verification code to the cryptographic server, receiving a transmission by the cryptographic server at the online service, whereby the user's address of residence is verified.

In one aspect, the online service generates the verification code.

In one aspect, the cryptographic server is equipped with a local camera, the code and the subsequent code are mailed in a form of a printed QR code, and the user scans the QR codes with the camera.

In one aspect, the method further includes, for the each user, the cryptographic server creating and storing at least one of an alias identity, a password, and a cryptographic key for the third-party service on behalf of the user.

In one aspect, the method further includes, for the each user: confirming an Internet-connected device by passing a registration code in a circuit including the online service, the cryptographic server and the Internet-connected device.

In one aspect, the method further includes, for the each user: in response to the confirming, registering the Internet-connected device with a unique identifier, wherein the request for access by the user to a third party service is received from the registered Internet-connected device and includes the unique device identifier.

In one aspect, the cryptographic server is equipped with a display, and the confirming an Internet-connected device includes: the cryptographic server displaying a registration code on the display; and the registration code being provided to the online service through the Internet-connected device.

In one aspect, the registration code is displayed in a form of a QR code, and the QR code is scanned by the Internet-connected device.

In one aspect, the confirming an Internet-connected device further includes: the online service sending the registration code to the cryptographic server.

In one aspect, the cryptographic server authenticating the user supports single sign-on between the user and the third-party service.

In one aspect, the method further includes, for the each user: the online service associating an identity of the user with the cryptographic server; in response to the online service receiving the request for access by the user to the third-party service, the online service requesting an identity from the user; and in response to the online service receiving the identity from the user, the online service connecting to the cryptographic server.

In one aspect, a method includes: operating an online service configured to receive requests for access by a plurality of users to a plurality of third-party services; and for each user of the plurality of users: deploying a network-connected always-on cryptographic server in a residence of the user, wherein the cryptographic server has a cryptographic relationship established with the online service prior to the deploying; establishing a trusted connection between the deployed cryptographic server and the online service based on the pre-existing cryptographic relationship; sending a code by postal mail to the user at the residence; in response to the user presenting the mailed code to the cryptographic server, receiving a transmission by the cryptographic server at the online service; the online service validating the residence of the user in association with the cryptographic server based on the received transmission and based on the pre-existing cryptographic relationship; confirming an Internet-connected device by passing a registration code in a circuit including the online service, the cryptographic server and the Internet-connected device; in response to the confirming, the online service registering the Internet-connected device as associated with the user; the online service receiving a request for access by the user to a third-party service through the Internet-connected device; in response to the online service recognizing the Internet-connected device in association with the request for access, the online service connecting to the cryptographic server; and in response to at least the online service connecting to the cryptographic server, the cryptographic server providing to the online service information that the cryptographic server holds for the third-party service on behalf of the user.

In one aspect, the information includes at least one of an alias identity, a password, and a cryptographic key for the third-party service.

In one aspect, the method further includes, for the each user: further in response to the online service recognizing the Internet-connected device in association with the request for access, prompting the user to provide credentials; and in response to receiving the credentials, the cryptographic server authenticating the user.

In one aspect, the cryptographic server authenticating the user supports single sign-on between the user and the third-party service.

In one aspect, the deployed cryptographic server is configured to communicate exclusively with the online service.

In one aspect, the cryptographic server includes a trusted and secure cryptographic chip inserted at manufacture time.

In one aspect, the cryptographic relationship is based on an exchange of public keys between the cryptographic server and the central service.

In one aspect, the method further includes, for the each user: establishing a trusted connection between the deployed cryptographic server and the online service based on the pre-existing cryptographic relationship, wherein the receiving a transmission by the cryptographic server at the online service uses the trusted connection.

In one aspect, the transmission by the cryptographic server includes the code.

In one aspect, the cryptographic server is equipped with a local camera, wherein the code is mailed in a form of a printed QR code, and wherein the user scans the QR code with the camera.

In one aspect, the method further includes, for the each user: in response to a request by the third-party service to initiate a verification of the user's address of residence, the online service transmitting a verification code to the third-party service, wherein the third-party service causes the verification code to be sent to the user at the residence by postal mail; and in response to the user presenting the mailed verification code to the cryptographic server, receiving a transmission by the cryptographic server at the online service, whereby the user's address of residence is verified.

In one aspect, the online service generates the verification code.

In one aspect, the cryptographic server is equipped with a local camera, the code and the subsequent code are mailed in a form of a printed QR code, and the user scans the QR codes with the camera.

In one aspect, the method further includes, for the each user: the cryptographic server creating and storing at least one of an alias identity, a password, and a cryptographic key for the third-party service on behalf of the user.

In one aspect, the registering the Internet-connected device includes the central service receiving a unique device identifier from the Internet-connected device, and the request for access by the user to a third party service includes the unique device identifier.

In one aspect, the cryptographic server is equipped with a display, and the confirming an Internet-connected device includes: the cryptographic server displaying a registration code on the display; and the registration code being provided to the online service through the Internet-connected device.

In one aspect, the registration code is displayed in a form of a QR code, and the QR code is scanned by the Internet-connected device.

In one aspect, the confirming an Internet-connected device further includes: the online service sending the registration code to the cryptographic server.

In one aspect, a system includes one or more computers operating an online service and a plurality of cryptographic servers, wherein the one or more computers and the plurality of cryptographic servers are configured to perform any one or more of the foregoing methods.

In one aspect, one or more non-transitory computer-readable media contain instructions that, when executed by one or more processors of one or more computers and a plurality of cryptographic servers, cause the one or more computers and the plurality of cryptographic servers to perform any one or more of the foregoing methods.

The invention claimed is:

1. A method comprising:
   operating an online service configured to receive requests for access by a plurality of users to a plurality of third-party services;

for each user of the plurality of users:
  deploying a continuously operating and network-connected cryptographic server in a residence of the user, wherein the cryptographic server has a cryptographic relationship established with the online service prior to the deploying;
  in response to the online service receiving a request for access by the user to a third-party service, the cryptographic server receiving credentials from the user; and
  in response to receiving the credentials, the cryptographic server authenticating the user;
for one of the plurality of users, the online service confirming that an original cryptographic server is no longer network-accessible; and
in response to confirming that the original cryptographic server is no longer network-accessible, initiating a process to establish a replacement cryptographic server as a functional replacement for the original cryptographic server.

2. The method of claim 1, wherein the deployed cryptographic server is configured to communicate exclusively with the online service.

3. The method of claim 1, wherein the cryptographic server comprises a trusted and secure cryptographic chip inserted at manufacture time.

4. The method of claim 3, wherein the cryptographic chip inserted at manufacture time supports remote attestation of the cryptographic server.

5. The method of claim 1, wherein the cryptographic relationship is based on an exchange of public keys between the cryptographic server and the online service.

6. The method of claim 1, further comprising, for the each user, the cryptographic server creating and storing at least one of an alias identity, a password, and a cryptographic key for the third-party service on behalf of the user.

7. The method of claim 6, wherein the process to establish the replacement cryptographic server as a functional replacement for the original cryptographic server comprises the replacement cryptographic server responding to a remote attestation request by responding with a cryptographic response to a random challenge.

8. The method of claim 1, further comprising, for the each user:
  confirming an Internet-connected device by passing a registration code in a circuit including the online service, the cryptographic server and the Internet-connected device.

9. The method of claim 8, further comprising, for the each user:
  in response to the confirming, registering the Internet-connected device with a unique identifier,
  wherein the request for access by the user to a third party service is received from the registered Internet-connected device and includes the unique device identifier.

10. The method of claim 8, wherein the cryptographic server is equipped with a display, and wherein the confirming an Internet-connected device comprises:
  the cryptographic server displaying the registration code on the display; and
  the registration code being provided to the online service through the Internet-connected device.

11. The method of claim 10, wherein the registration code is displayed in a form of a QR code, and wherein the QR code is scanned by the Internet-connected device.

12. The method of claim 8, wherein the confirming an Internet-connected device further comprises:
  the online service sending the registration code to the cryptographic server.

13. The method of claim 1, wherein the cryptographic server authenticating the user supports single sign-on between the user and the third-party service.

14. The method of claim 1, further comprising, for the each user:
  the online service associating an identity of the user with the cryptographic server;
  in response to the online service receiving the request for access by the user to the third-party service, the online service requesting an identity from the user; and
  in response to the online service receiving the identity from the user, the online service connecting to the cryptographic server.

15. A system comprising one or more computers operating the online service and a plurality of cryptographic servers, wherein the one or more computers and the plurality of cryptographic servers jointly perform and/or cause to be performed the method of claim 1.

16. One or more non-transitory computer-readable media, the media containing instructions that are executed by one or more processors of one or more computers to cause the one or more computers to perform and/or cause to be performed the method of claim 1.

* * * * *